United States Patent [19]
Mihalisin et al.

[11] Patent Number: 5,228,119
[45] Date of Patent: Jul. 13, 1993

[54] MULTI-DIMENSIONAL GRAPHING IN TWO-DIMENSIONAL SPACE

[75] Inventors: Ted W. Mihalisin, Ambler; John Timlin, Philadelphia; Edward T. Gawlinski, Horsham; John W. Schwegler, Philadelphia, all of Pa.

[73] Assignee: Temple University, Philadelphia, Pa.

[21] Appl. No.: 608,337

[22] Filed: Nov. 2, 1990

Related U.S. Application Data

[63] Continuation-in-part of Ser. No. 589,820, Sep. 28, 1990.

[51] Int. Cl.$^5$ .............................. G06F 3/14; G06F 7/00
[52] U.S. Cl. ...................................... 395/118; 395/119; 395/140; 395/141
[58] Field of Search .................. 364/DIG. 1, DIG. 2; 340/723, 736, 744, 747; 395/118, 119, 140, 141, 142, 143

[56] References Cited

PUBLICATIONS

1987 Sale of Data Analysis Tool for Use on HP Series 9000 Computers, Models 200 and 300.
*Computer*, IEEE Society, Aug. 1989, Entire Issue.
"EXVIS: An Exploratory Visualization Environment," G. Grinstein, R. M. Pickett & M. G. Williams, Graphics Interface '89 (proceedings) pp. 254–261 Canadian Int. Process Soc., Toronto, Ontario, Canada (1989).
"The Use of Faces to Represent Points in k-Dimensional Space Graphically," Herman Chernoff, Journal of the American Statistical Association, vol. 68, No. 342, pp. 361–368 Jun. 1973.
"Parallel Coordinates: a Tool for Visualizing Multi-Dimensional Geometry," Inselberg and Dimsdale, Proceedings of the 1st IEEE Conference on Visualization, Visualization '90 (edited by Arie Kaufman), IEEE Computer Society Press, Los Alamitos, 1990, pp. 361–378.
"Graphics for the Multivariate Two-Sample Problem," Friedman and Rafsky, Journal of the American Statistical Association, vol. 76, No. 364, pp. 277–278, Jun. 1981.
"A Triangulation Method for the Sequential Mapping of Points from N-Space to Two-Space" R. C. T. Lee, J. R. Slagle & H. Blum, IEEE Transactions, Computers, Mar. 1977, pp. 288–292.
"Dynamic Graphics for Statistics," edited by William S. Cleveland and Marylyn E. McGill, Wadsworth & Brooks/Cole, Belmont, Calif., 1988 (pp. 1–12 enclosed).
"Representing Points in Many Dimensions by Trees and Castles," Kleiner & Hartigan; Journal of the Amer. Stat. Assoc., vol. 76, No. 374, pp. 260–269, Jun. 1981.
"Visualizing n–D Virtual Worlds with n–Vision," Computer Graphics, 24(2), Feiner & Beshers, pp. 37–38, Mar. 1990 (proc. 1990 Symp. on Interactive 3D Graphics, Snowbird, Utah, Mar. 25–28, 1990).
"Exploratory Data Analysis," John W. Tukey, Addison-Wesley, Reading, Mass. (1977).
"The Visual Display of Quantitative Information," Graphics Press, Cheshire, Conn. (1983).
"Graphical Methods for Data Analysis," Wadsworth International Group, Belmont, Calif. Duxbury Press, Boston, Mass. (1983).
"Dynamic Graphics for Statistics," edited by William S. Cleveland and Marylyn E. McGill, Wadsworth, Belmont, Calif. (1988) (not supplied).

*Primary Examiner*—Robert L. Richardson
*Attorney, Agent, or Firm*—David Newman & Associates

[57] ABSTRACT

A method and system for displaying a function in two dimensions where the function is made up of numerous independent variables and at least one dependent variable. A new independent variable value can be defined having values which correspond to the multiple dependent variables. The variable values are read into a computer and the independent variables are then ranked by the user from fastest- to slowest-running variable. Each dependent variable corresponding to the new independent variable is plotted along the Y-axis. The independent variable values are plotted along the X-axis in a hierarchical manner. The hierarchical manner involves a nesting of fastest-running variables within slower-running variables. Rectangles are then drawn to correspond to each variable value. Each rectangle horizontally encloses the faster-running variables associated with it.

28 Claims, 17 Drawing Sheets

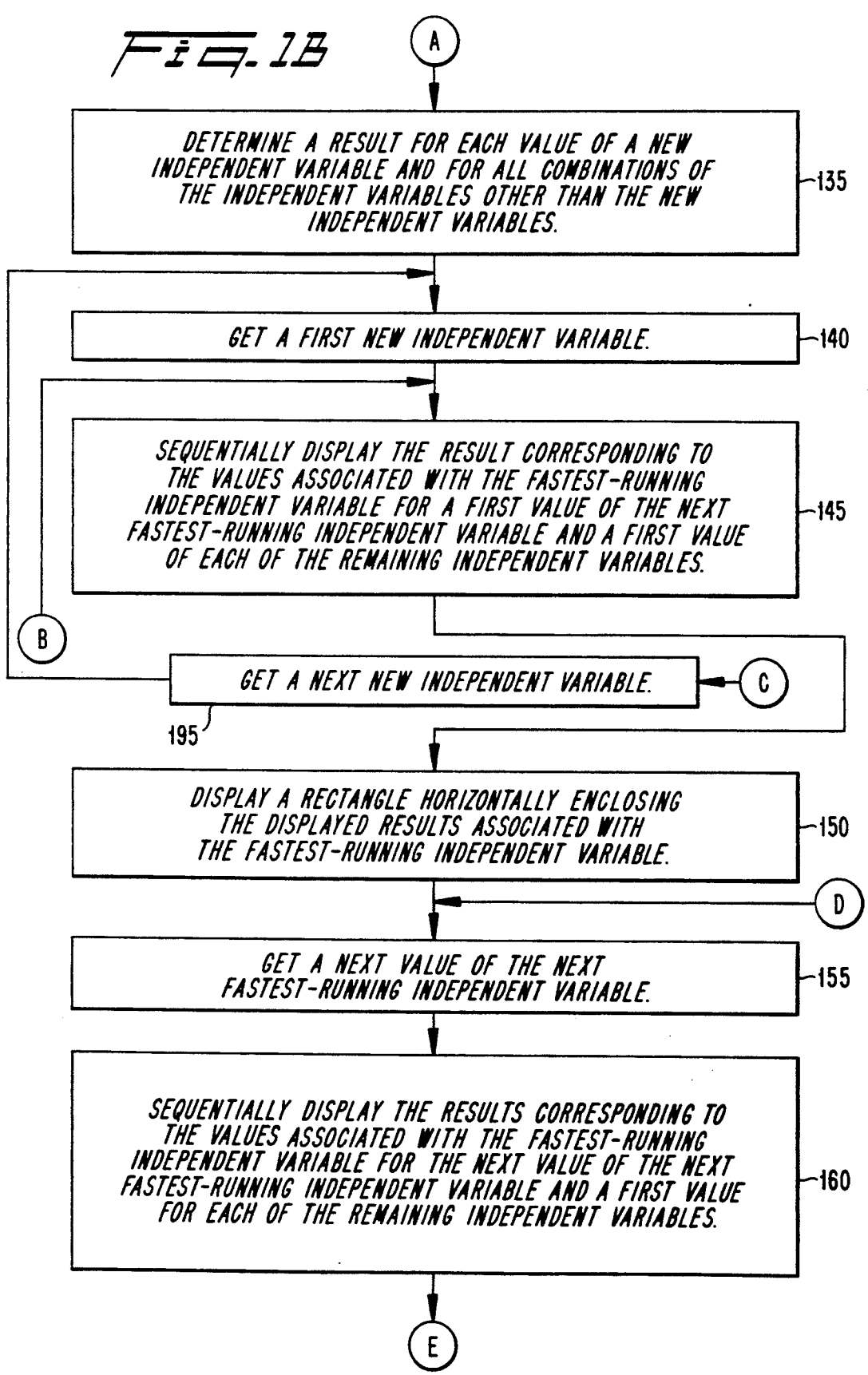

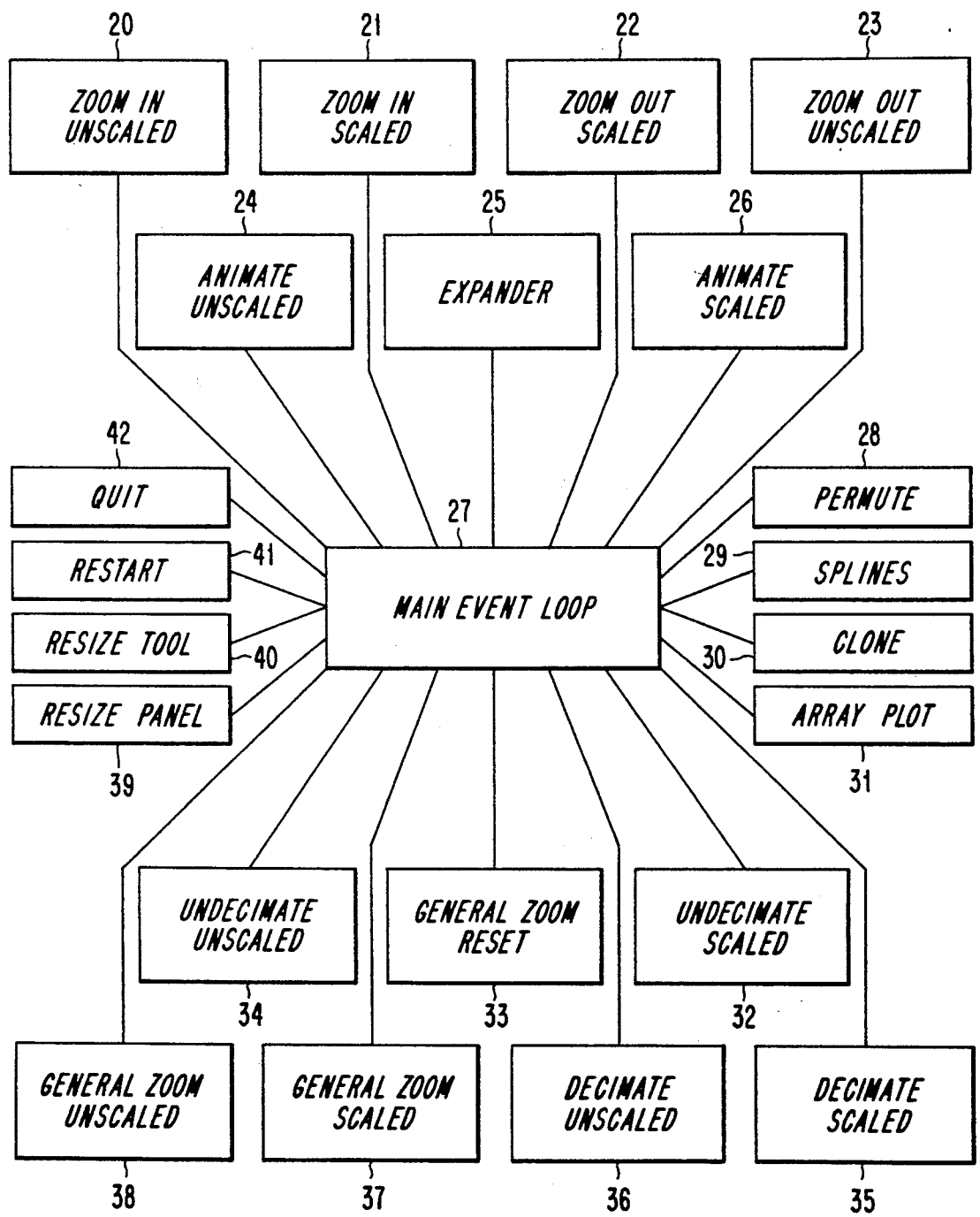

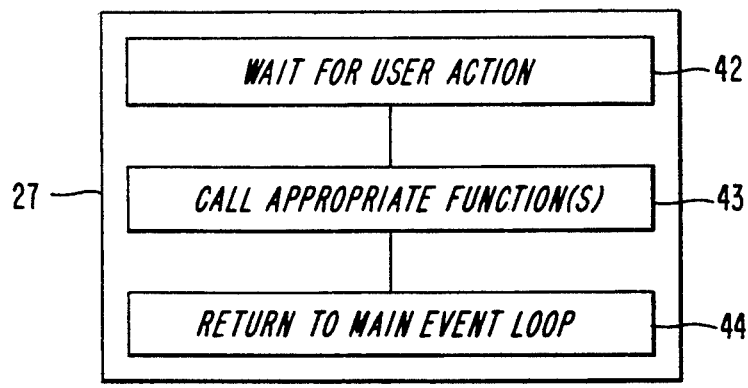
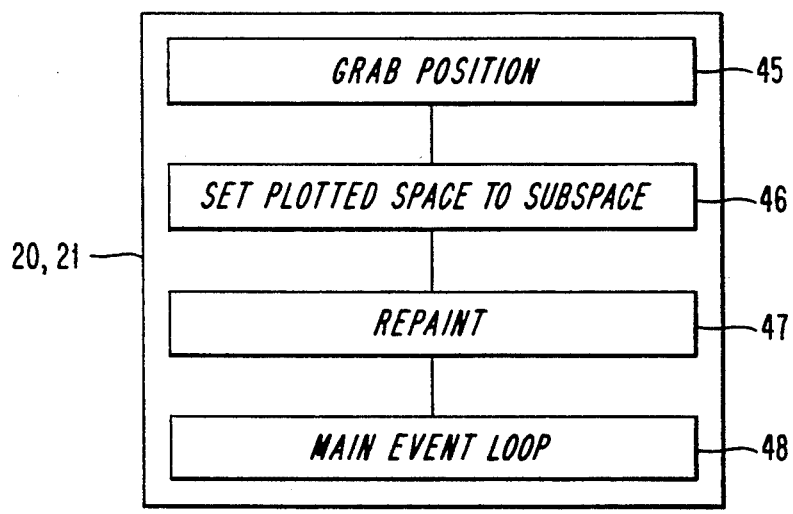
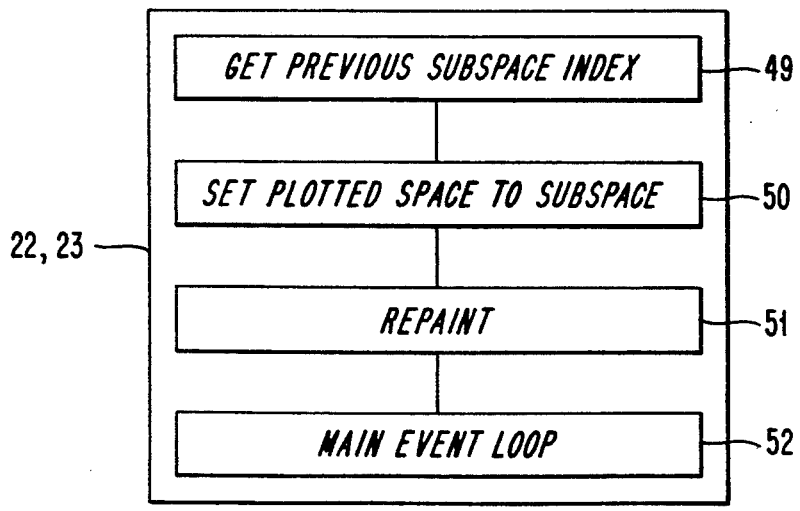

FASTEST t FASTEST, h SLOWEST t FASTEST, h SLOWEST t FASTEST, h SLOWEST t FASTEST, h SECOND FASTEST, DVS SLOWEST

DVS FASTEST, t SECOND FASTEST, h SLOWEST t FASTEST, DVS SECOND FASTEST, h SLOWEST

MULTI-DIMENSIONAL GRAPHING IN TWO-DIMENSIONAL SPACE

This application is a continuation-in-part of pending U.S. Patent application Ser. No. 07/589,820, filed Sep. 28, 1990.

FIELD OF THE INVENTION

This invention related to graphing of data or mathematical functions which have two or more independent variables and one dependent variable.

BACKGROUND OF THE INVENTION

Graphs have long served the purpose of allowing visual perception and interpretation of data sets and functions. Typically, graphing involves plotting in two dimensions along an X and a Y axis. This involves the plotting of a Y "independent" variable against an X "dependent" variable.

There are other systems and methods for visualizing 3-D data. Such techniques include color maps, contours, wire meshes, as well as numerous other surface rendering techniques. All too often, 3-D or multi-dimensional data sets are viewed in two dimensions in the form of X,Y plots, and then repeated over various combinations until all variables are completed. Another graphing technique involves the maintenance of variables as parameters in order to produce a two dimensional X,Y plot.

Still another method of multi-dimensional graphing is referred to as a graph "matrix." This consists of plotting all points in the multi-dimensional space in terms of their projections onto all possible planes. This technique proves to be quite useful in analyzing randomly sampled data (as opposed to lattice or grid-like data), especially in statistical investigations in which a clear identification of the dependent and independent variables may not be possible. Since it is the projection of all data points onto the various planes that is shown, a variety of data "labeling" and "brushing" tools have been developed in order to identify corresponding points for each of the graphs.

These "matrix" graphs do not provide an easy and intuitive means of recognizing the mathematical form that one should use to fit multi-dimensional data. The primary reason for this shortcoming is that the matrix graph technique displays projections onto a particular two-dimensional subspace rather than all possible "parallel" planar slices through this space (corresponding to all possible values of the remaining variables).

SUMMARY OF THE INVENTION

This invention comprises a system and method using a computer for graphing multi-dimensional data sets or functions in two-dimensional space. This two-dimensional space can be defined by an X- and a Y-axis. The system includes defining means, reading means, first selecting means, second selecting means, ranking means, determining means, plotting means, group means, and looping means. The plotting means further includes first sequential displaying means, second displaying means, first repeating means, and second repeating means. The method involves reading values which are to be associated with the independent variables of the function as well as the resulting values associated with the dependent variable of the function. It is also possible in the invention for the values associated with the dependent variable to be calculated in real time.

A new independent variable is defined by the defining means to represent multiple dependent variables. Each value of the new independent variable corresponds to a dependent variable. The values associated with all of the independent variables, including the new independent variable, are ranked by the user using the first selecting means, second selecting means, and ranking means of the system in order from fastest- to slowest-running variables. The order in which the variables are ranked is flexible in designation by the user. The independent variables are then plotted by the plotting means along the X-axis while the dependent variable or variables, corresponding to a value of the new independent variable, are then plotted by the plotting means along the Y-axis. The determining and plotting of the results are then repeated using looping means.

Rectangles encompassing the next fastest-running variables are displayed by the group means on the screen or plotting device. The rectangles are displayed in different colors with each color corresponding to a different variable subspace for an aid in visual representation and interpretation to the users. The rectangles all have a height and the height of each rectangle can be dependent on different functions. In one case, the height may be equal to the difference between a maximum and a minimum value of the dependent variable within the rectangle. In another case, the height of the rectangle may be equal to the sum of the values of the dependent variable encompassed within the rectangle. In still another case, the height of the rectangle may be dependent on some function of the next fastest-running variable, or some function of any of the rectangles.

This method and system serves as a useful tool in the display and analysis of data sets and functions which can be arranged in a grid-like or lattice-like orientation. Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE FIGURES

The file of this patent contains at least one drawing executed in color. Copies of this patent with color drawings will be provided by the Patent and Trademark Office upon request and payment of necessary fee. The accompanying drawings, which are incorporated in and constitute a part of the specification, illustrate preferred embodiments of the invention, and together with the description serve to explain the principles of the invention.

FIGS. 1A, 1B and 1C show a flow chart of the method of the present invention.

FIG. 4 shows the program structure of the present invention.

FIG. 5 shows the main event loop of the present invention.

FIG. 6 shows a flow chart of the Zoom In tool.
FIG. 7 shows a flow chart of the Zoom Out tool.

DETAILED DESCRIPTION OF THE INVENTION

The present invention pertains to a method for plotting scalar fieldson an N-dimensional lattice. It is useful, among other things, for a variety of data visualization tasks such as the location of maxima, minima, saddle points and other features. It is also useful for visually fitting multi-variate data and for making the visual determination of dominant and weak or irrelevant variables.

In one embodiment of the invention, each independent variable is sampled in a regular grid or lattice-like fashion (spaced in equal increments). The number and spacing of values may differ for each variable, however, in this embodiment no missing values are allowed. Thus, the N independent variable values form a hyper-rectangular lattice in the N-dimensional space within hyper-rectangular parallelipiped domain.

Since the definition of a function is a locus of points, the present invention pertains equally to plotting functions or plotting data values.

Figure 1A:
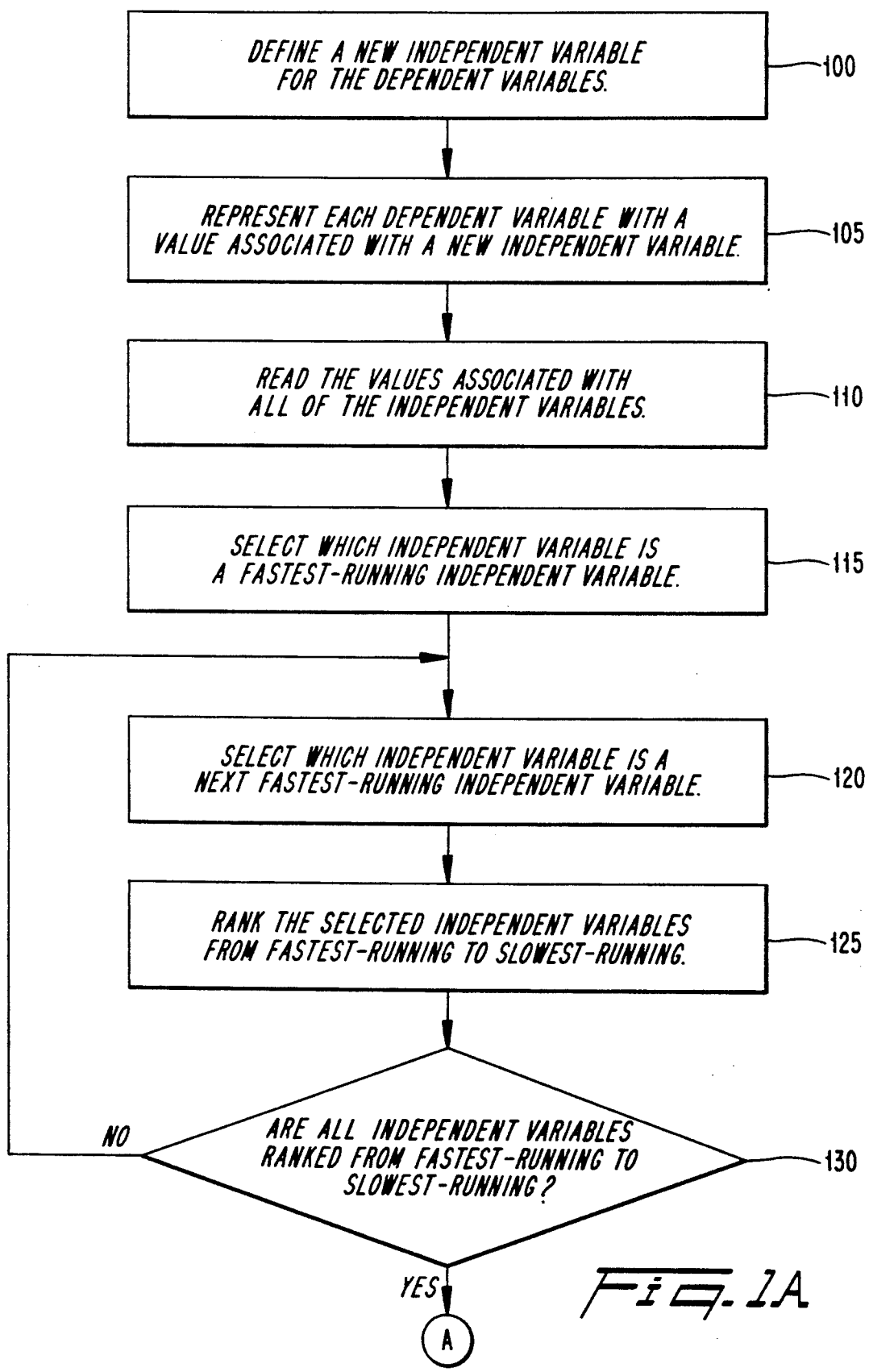
Figure 1C:
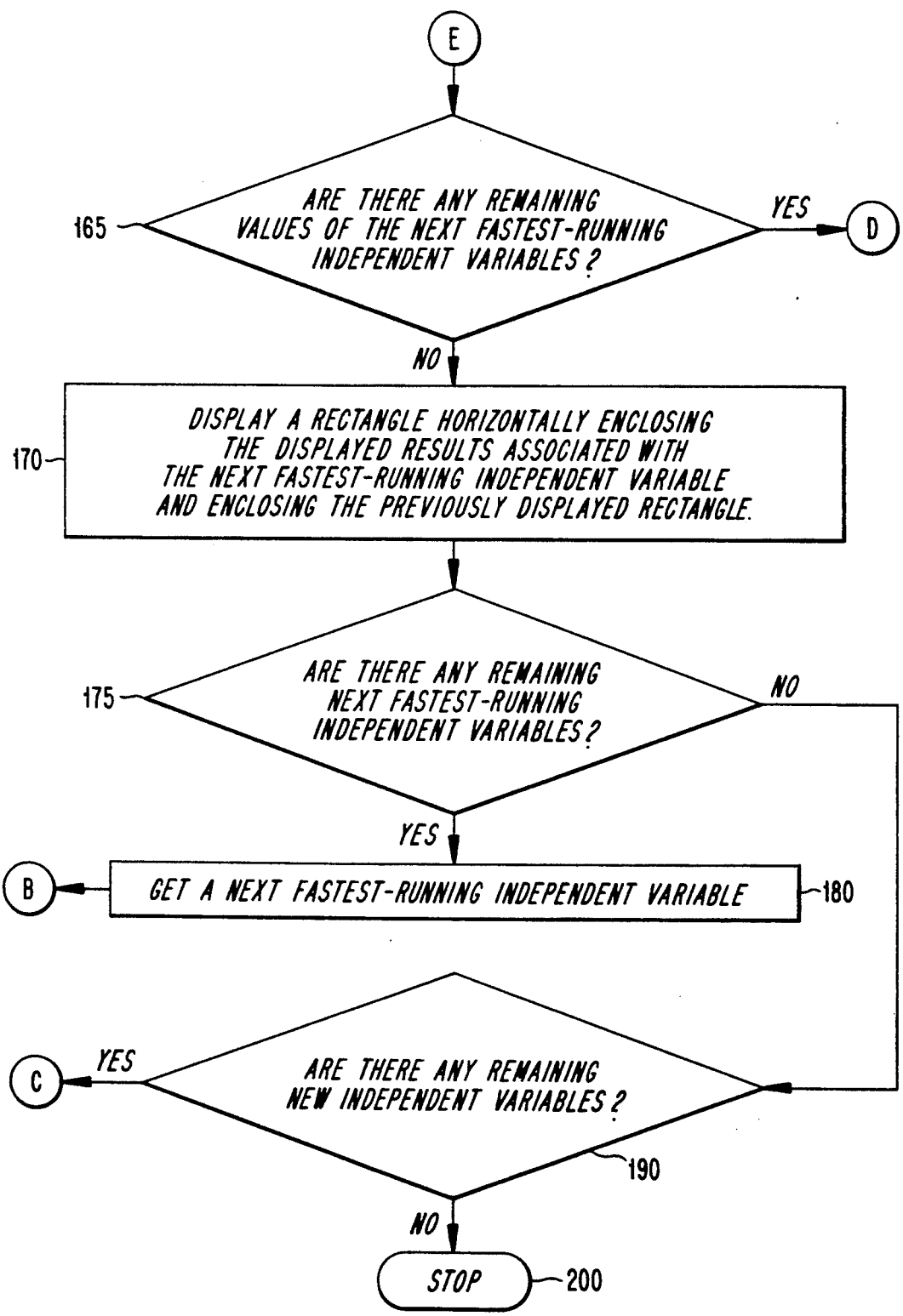

FIGS. 1A, 1B and 1C show a flowchart of the method of the present invention. Referring to FIG. 1, the system defines 100, using the defining means, new independent variables for the dependent variables, with the new independent variables having associated values. With the defining means, the system represents 105 the dependent variables with values associated with the new independent variables. The system, with the reading means, reads 110 the values of the independent variables. There are numerous ways in which data values can be entered into a computer, such as through a data file or a real time solution of an equation.

Figure 14:
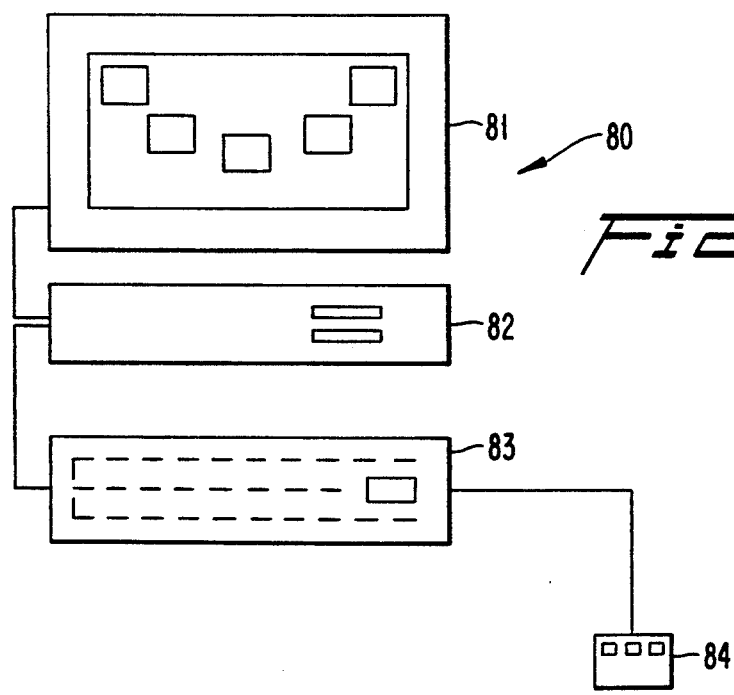
FIG. 14 shows an embodiment of the invention.

The system, using the computer, then allows the user to select 115, using first selecting means, the independent variable which is fastest-running, and ranking the selected independent variable, with the first selecting means, as the fastest-running independent variable. The first selecting means may be embodied as a software subroutine coupled to user inputs from a mouse 84 or a keyboard 83, in conjunction with user prompts from display 81, as shown in FIG. 14. They system then allows the user to select 120, using second selecting means, the independent variable which is next fastest-running, and ranking the selected independent variable, with the second selecting means, as the next fastest-running independent variable. The second selecting means may be embodied as a software subroutine coupled to user inputs from a mouse 84 or a keyboard 83, in conjunction with user prompts from display 81, as shown in FIG. 14.

The system then repeats 130, using ranking means, the selecting of independent variables from fastest to slowest, and ranks 125 the selected independent variables until all independent variables are ranked form fastest-running to slowest-running. This invention plots multi-dimensional variables in two-dimensional space based on a hierarchical ranking of variables, and the resulting rectangles which are plotted thereupon. In order to do so, it is necessary for the operator or the computer system, if it is configured as such, to rank the variables from fastest to slowest-running variable. This can be a completely arbitrary ranking, and in fact it is often useful to view the multi-dimensional graphs in different combinations of rankings of the independent variables. Regardless, it is necessary to set up a ranking from fastest to slowest by whatever designation is desired by the user.

The system, using the computer, determines 135, using determining means, a result for each value of a new independent variable for all combinations of the values of all remaining independent variables other than the new independent variable. Using plotting means, the corresponding dependent variable values are plotted in two-dimensional space. With the independent variables ranked in their hierarchical fashion and plotted against the X-axis, the corresponding dependent variable value is plotted along the Y-axis. This gives a distribution of values in two-dimensional space. In some embodiments of the invention, the dependent variable values are already computed or known and read into a data file similar to the independent variable values. In other embodiments, the dependent variables are calculated based on the independent variable values. In either case, the dependent variable values are plotted along the Y-axis. It should be noted that, similar to the flexibility in the ranking of the independent variables, it is possible to change the designation of variables from independent to dependent, and vice versa. Again, this produces different visual results which may be more useful in interpreting the data sets. The plotting means includes first sequentially displaying means, second sequentially displaying means, first repeating means, and second repeating means. Using the first repeating means, the system gets 140 the first independent variable, and sequentially displays 145 the results corresponding to the values associated with the fastest-running variable for a first value of the next fastest-running variable and a first value of each of the remaining independent variables. After the displaying 145 of the results for the fastest-running independent variable, a rectangle is displayed 150, using group means, by horizontally enclosing the displayed results associated with the fastest-running independent variable.

The system then gets 155 a next value of the next fastest-running independent variable and sequentially displays 160 the result, using the second sequentially displaying means, corresponding to the values associated with the fastest-running independent variable for a next value of the next fastest-running independent variable and a first value for each of the remaining independent variables. The first repeating means repeats 165 getting 155 a next value and displaying 160 the results for each remaining value of the ext fastest-running independent variable until there are no remaining values of the next fastest-running independent variable.

Using the group means, the system displays 170, on the display, a rectangle horizontally enclosing the displayed results associated with the next fastest-running independent variable, while also enclosing the previously displayed rectangle, thereby nesting the faster-running variables within the rectangles of the slower-running variables according to the hierarchical plotting of the results.

The system, using second repeating means, gets 180 a next fastest-running independent variable and repeats steps 145 to 170 of FIG. 1 until 175 there are not remaining next faster-running independent variables, i.e. the last value of the slowest-running independent variable is displayed. The system, using looping means, then gets 195 a next new independent variable and repeats steps 140 to 180 until 190 there are no remaining new independent variables, and the plotting of the variables and nesting of results in rectangles stops 200.

Figure 3A:
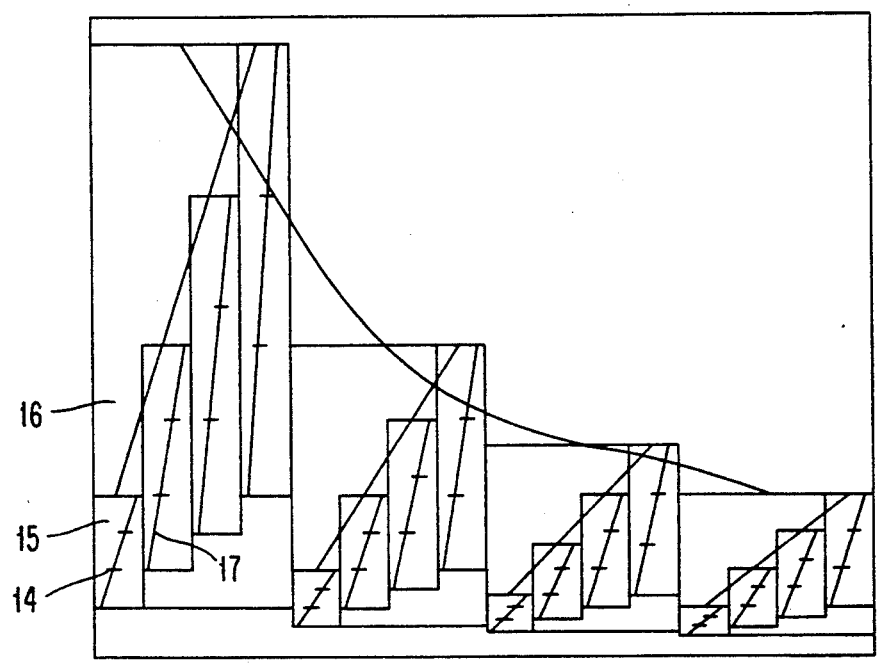
FIGS. 3A and 3B show illustrations of example applications of the present invention.
Figure 3B:
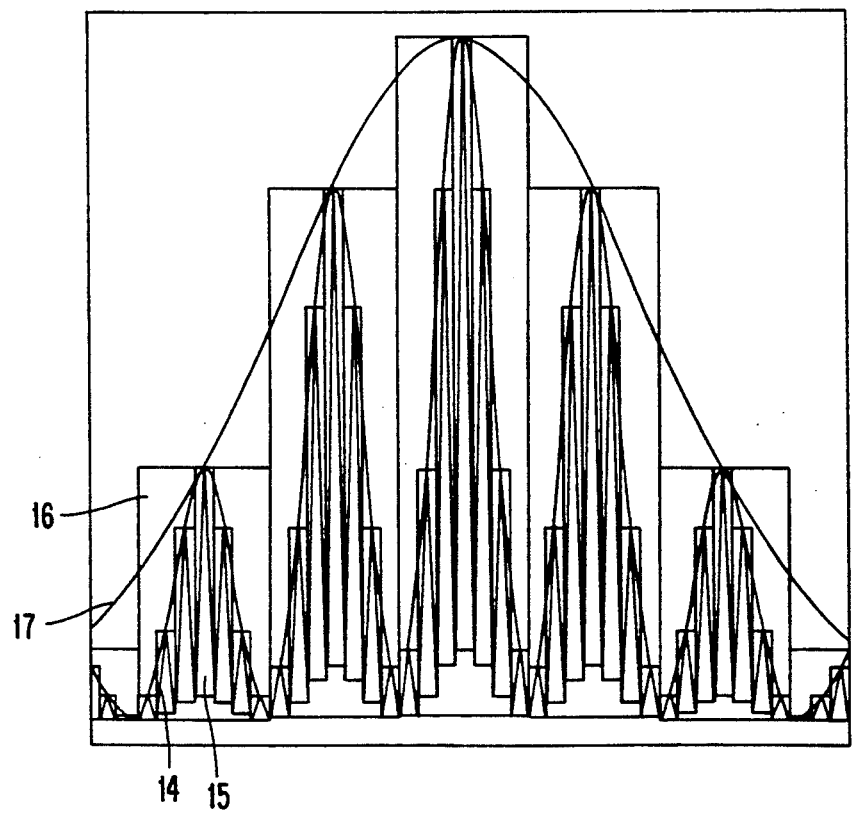

The multi-dimensional graphing and two-dimensional space method and system works by displaying hierarchical rectangles in different colors. The fastest-running variables are displayed in the present embodiment as "hash" marks. These hash marks can be thought of as rectangles having zero height. The next fastest variable then becomes a rectangle encompassing the fastest-running variable values throughout the range of the next fastest-running variable. This iteration of next fastest-running variables continues until the slowest-running variable is accounted for. This results in a nesting of rectangles as shown in FIGS. 3A, 3B and 3C. FIGS. 3A, 3B, and 3C are graphical representation using the present invention of the Ideal Gas Law. The Ideal Gas Law is described in the form P=nRT/V, where P is pressure, n is a number of moles, R is the gas constant, T is the temperature (in degrees Kelvin), and V is the volume occupied by the gas.

Figure 2:
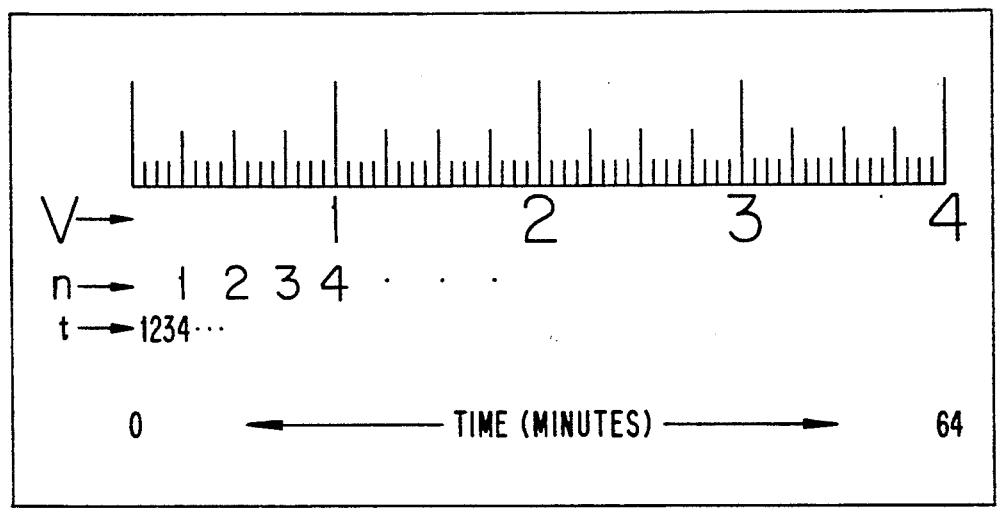
FIG. 2 shows an illustration of an example application of the present invention.

The ranking of the independent variables T, n and V is shown is FIG. 2 in their corresponding positions on the X-axis. In this particular case, T is designated as the fastest-running variable and is illustrated along the number line as the smallest set of hash marks; n is the next fastest-running variable, and this is shown as the next largest set of hash marks. Finally, V is shown as the slowest-running variable, and this is illustrated as the largest set of hash marks.

It can be seen in FIG. 2 that the fastest-running variables are nested within each next fastest-running variable and then repeated for the negative value of the next fastest-running variable. This translates to T values of 1, 2, 3 and 4, while n=0 and V=0. Then, T runs through 1, 2, 3 and 4, while n=1 and V=0, etc., until completed for all four values of n (1-4). This cycle is then repeated for all values of V from 1-4.

The result of this is shown in FIG. 3A. In FIG. 3A, three colors are used. Color selections are made by the operator. White (14) designates the fastest-running variable T, while blue (15) represents the next fastest-running variable n and, finally, orange (16) represents the slowest-running variable V. When looking at the graph, the value P is plotted along the Y-axis while the independent variable values are plotted along the X-axis.

The white hash marks designate the T value. The white hash marks are connected by splines (17), whose purpose is to aid in the visual interpretation. They are not a requirement of the present method and system, but instead a useful interpretative tool. The splines are used in connecting groups of rectangles, i.e., fastest, next fastest and slowest-running variables.

The blue rectangles represent the value of n. Each blue rectangle encompasses four of the white hash marks (fastest-running variables), as there are four values of T for each value of n. The blue rectangles are also connected by splines.

Finally, the orange rectangles which represent the variable values V encompass four blue rectangles. This is a result of there being four values of n for each value of V.

Thus, a nesting of rectangles in a hierarchical fashion illustrates the graph of the Ideal Gas Law. One can view the different groupings of variables at any point to interpret the data set, while at the same time seeing conditions on either side of that location for the entire set of variable values.

FIG. 3B shows a graph representing the gaussian function $w=e^{-(x^{}2+y^{}2+z^{**}2)}$ using the invention.

FIG. 4 shows an overview of the program structure of an embodiment of the present invention. This system chart of the program structure shows the available tools all connected to a main event loop 27. Main event loop 27 is shown in FIG. 5. All tools and operational commands are initiated via subroutine calls in the present embodiment of the invention. The tools are shown in FIGS. 6-13.

In FIG. 5, there is shown a flow chart of the basic operation of main event loop 27. The main event loop is a central point of program flow. After the program embodying the present invention is initialized, it enters the main event loop and all subsequent actions are dispatched from here. An event is usually some user input requesting some action of the program. Once the main event loop is entered, it continually scans for an event (i.e., tool). When an event is detected (received), the main event loop determines what action should be taken and issues the appropriate function calls subroutine calls). After the function (tool) completes its execution, the main event loop resumes scanning for user input.

In block 42, the main event loop awaits for user action. Then, after user action such as the toggling of buttons on a mouse or pressing of keys on a keyboard, an appropriate function call is made in block 43. The function (or subroutine) is called and completed and then processing returns to the main event loop in block 44. The main event loop then keeps cycling waiting for user input before making the appropriate function calls.

FIG. 6 shows a flow chart of the Zoom In tool (20 in unscaled mode or Zoom In tool 21 in scaled mode). The Zoom In tool reduces the dimensionality of the plotted space. One of the currently displayed second slowest-running variables is selected from the currently displayed slowest-running variable, and this selected second slowest-running variable becomes the currently displayed slowest-running variable. The net effect of this tool is to zoom in on one of the spaces or subspaces. This tool can be used for finding maxima and minima.

In the scaled version, the zoomed-in subspace is proportioned to the size of the display screen. In the unscaled Zoom In, the selected subspace is kept in its original proportion as in the space from which it was selected. Unscaled tools allow the user to see tendencies, such as decay and growth.

The Zoom In tool operates by grabbing the position of the variable space to be zoomed in, as shown in block 45. This can be accomplished by pointing to the variable space (rectangle) using a mouse or other pointing device. Next, the plotted space (displayed space) is set to the subspace selected in block 45. This is shown in block 46. In block 47, the display space is repainted in either scaled or unscaled version showing the zoomed-in subspace. In block 48, control returns to the main event loop to continue scanning for new events.

FIG. 7 shows a flow chart of the Zoom Out tool. The Zoom Out tool corresponds to block 22 (in unscaled form) and block 23 (in scaled form) of FIG. 4. The Zoom Out tool works inversely to the Zoom In tool and, as such, increases the dimensionality of the plot. Note that the dimensionality cannot be increased above the maximum starting value. The subspace which runs slower than the currently displayed slowest-running variable becomes the currently displayed slowest-running variable. This, again, is up to the maximum starting value.

An index is kept when zooming into subspaces so that the control system of the present invention can monitor the level of display of the current displayed space.

In block 49, the previous (zoomed-in) subspaced index is retrieved. In block 50, the plotted space (displayed space) is set to this subspace index value. In block 51, the plotted space is repainted to the subspace corresponding to this index value. Then, in block 52, control returns to the main event loop and scans for new events. This can be accomplished in numerous ways, and in the present embodiment is operated by clicking on one of the mouse buttons. It could just as easily be configured to work via keyboard commands.

Figure 8:
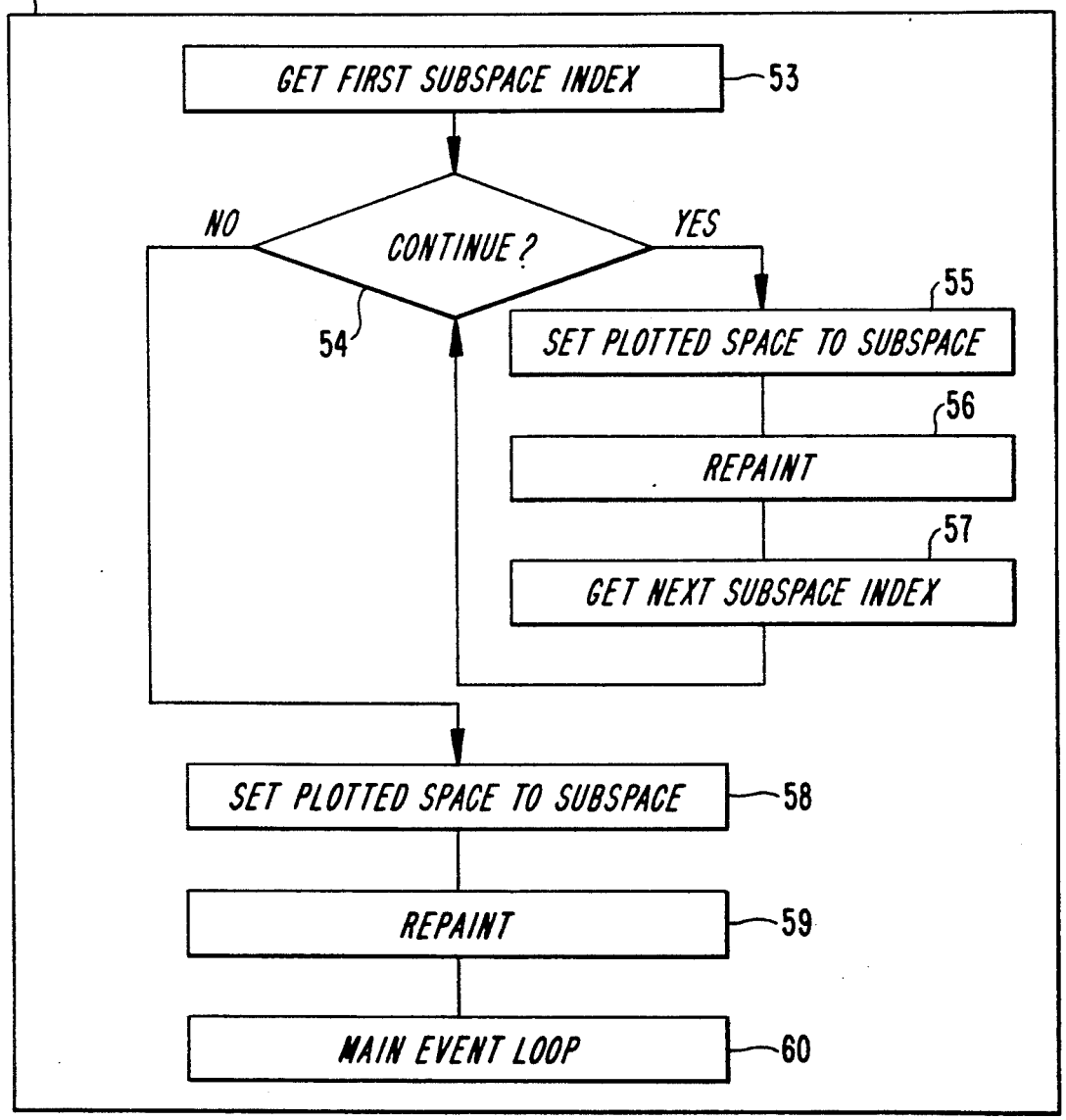
FIG. 8 shows a flow chart of the Animate tool.

FIG. 8 shows a flow chart for the Animate tool. The Animate tool sequentially displays each subspace in the currently displayed slowest-running variable. In the present embodiment, the sequential display cycles continually over the subspaces until the user terminates the animation. It is possible in other embodiments to set the cycling to a designated number. It is also possible to have a manually operated cycling operated by a pointing device such as a mouse, or through keyboard commands.

The Animate tool can be operated in unscaled mode 24 or scaled mode 26. As with the other tools, scaled mode proportionally adjusts the currently displayed subspace to fill the display screen, while unscaled mode maintains the sizing of the designated subspace without adjustment.

The Animate tool operates by first retrieving the subspace index in block 53. At decision block 54, it is determined whether to continue with the Animation process. Should the user desire to continue, processing moves along to block 55, where the plotted space is set to the subspace index. In block 56, the plotted space is repainted according to the display for the subspace index. This will be in either scaled or unscaled mode, depending on the user's selection. In block 57, the next subspace index is obtained. Processing then returns to decision block 54, and the user determines whether or not to continue with the animation. Should the decision be "NO," processing continues to block 58 where the plotted space is set to the last subspace index. The screen is then repainted in block 59, and processing returns to the main event loop in block 60.

Figure 9:
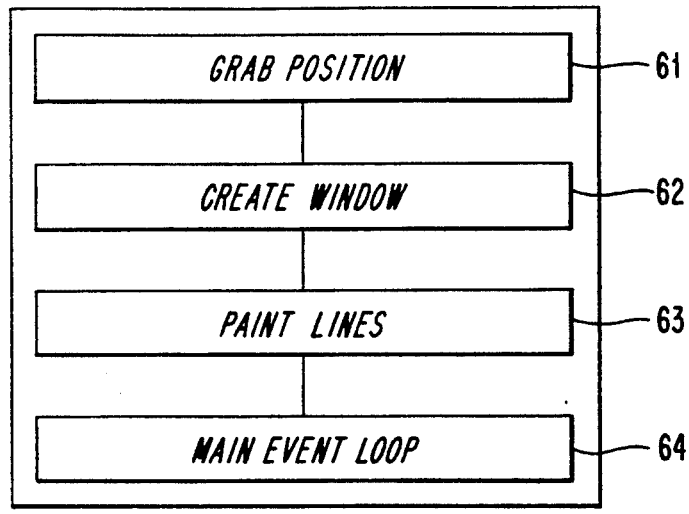
FIG. 9 shows a flow chart of the Expander tool.

FIG. 9 shows a flow chart for the Expander tool. The Expander tool is applied about a particular point in the multi-dimensional space, and displays the variation along each independent variable using a homogeneous horizontal increment for each variable rather than the hierarchical increment which is the basis for the multi-dimensional graphing and two-dimensional spaced method and system. The Expander tool takes a section of each variable through the point expanded upon, but does not sample all points in the display space. This tool is useful for tasks such as finding minima and maxima.

The expander tool allows one to view how the dependent variable changes as one moves away from the point in question in the white independent variable direction until one reaches the edges of the data domain, similarly for the blue, red, etc., independent variables. This tool can clearly be generalized by showing variations as one moves away from the point of expansion in more complex ways that involve non-parallel moves. For example, one could show the variations that occur when, in addition to the standard expander tool moves, one also displays moves about each point that correspond to incrementing all of the other colored variables by ± one. Further generalizations can involve all possible moves about the new points until, in fact, one could show all possible paths through the N dimensional space.

In block 61, the position or point is grabbed. In block 62, a new window is created for displaying the results of the expansion. In block 63, the lines representing the expansion through the point are painted. The painting of the lines is completed in the colors representing the corresponding independent variables. In block 64, processing returns to the main event loop.

Figure 10:
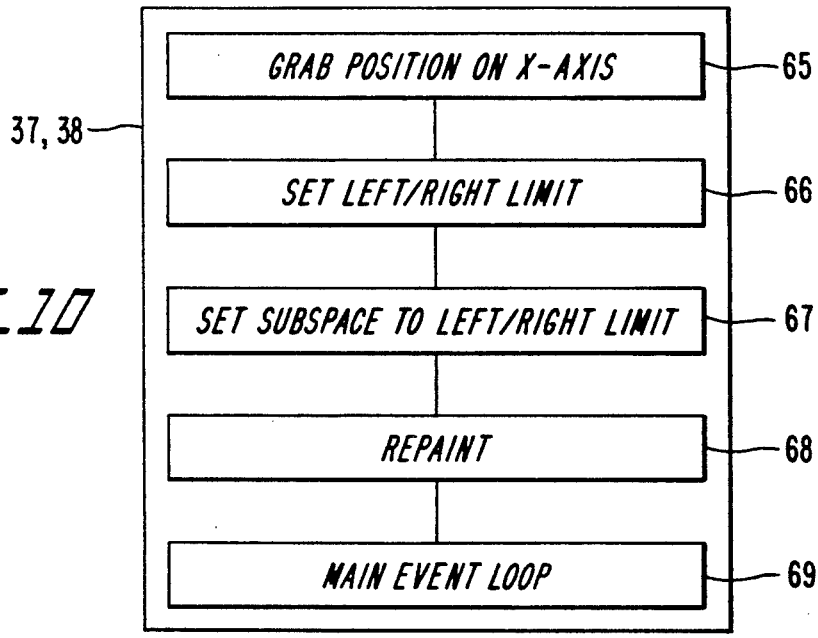
FIG. 10 shows a flow chart of the General Zoom tool.

FIG. 10 shows a flow chart for the operation of the General Zoom tool. This General Zoom tool sets the limits, left and right, of the currently displayed slowest-running variable. The General Zoom tool does not change the currently displayed slowest-running variable. This tool is useful for showing portions of the currently displayed subspace. The General Zoom tool can be used in scaled (block 37) or unscaled (block 38) mode. The scaling and unscaling is exactly the same as has been described for the previous tools. This, as always, is a user designation.

In block 65, the position on the X-axis is obtained for the left and right boundaries. In block 66, these boundaries are set as left and right limits. In block 67, the subspace is set to the left and right limits which were set in block 66. In block 68, the displayed subspace in repainted with the new left and right boundaries. In block 69, processing returns to the main event loop.

In the present embodiment of the invention, the General Zoom tool applies for all subspaces that the user now goes into and out of. This is a design choice, and is not a limitation of this tool in the present invention. Also, the General Zoom can be reset to the original limits in block 33 of FIG. 4.

Figure 11:
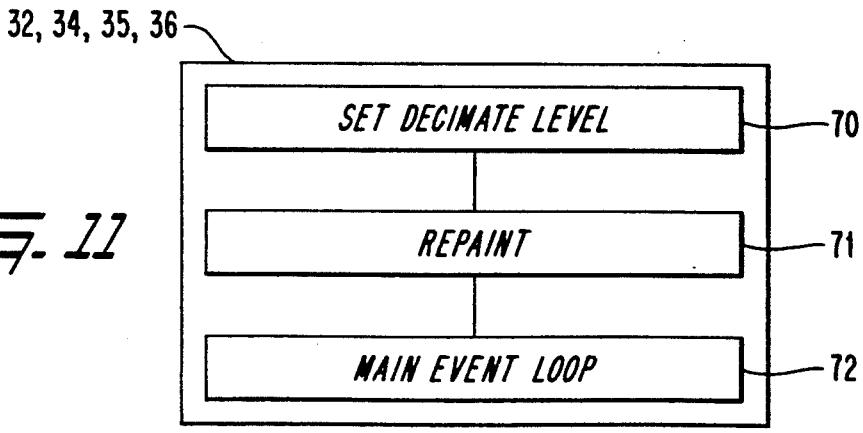
FIG. 11 shows a flow chart of the Decimate tool.

FIG. 11 shows a flow chart for the Decimate/Undecimate tools 32, 34, 35 and 36. As with the other tools, the Decimate and Undecimate tools operate in a scaled or unscaled mode.

The Decimate tool decreases the number of currently displayed slowest-running variable subspaces by only plotting every Nth subspace, where N is the level of decimation. The Undecimate tool operates in the opposite manner, but is limited to undecimating only decimated subspaces.

Without the Decimator tool, an obvious drawback to this embodiment of the invention is that each data point uses at least one horizontal pixel. Since work station monitors generally have about $10^3$ pixels horizontally, this obviously limits the number of total data points displayed at any one time to $10^3$. This is despite the fact that multi-dimensional problems tend to require large numbers of data points.

The Decimator tool allows a fraction of the total distinct values for each variable to be displayed. In many cases, this still allows useful interpretation of the data and functions. For example, in a data set that has $10^6$ data points, one can show only the first, fourth, seventh and tenth values for each variable, hence, reducing the total number of points that need to be displayed to $4^6$, or 4096. This makes it necessary to scroll only four frames, instead of one thousand, to see the "entire" data set.

In order to get a detailed look at a particular subspace, the zoom tool can be used. It is also possible to decimate certain variables in certain increments, while other variables in other increments. In another possible embodiment of this invention, a combination Zoom and Decimator tool is used for handling large data sets.

In block 70, the decimate level is set. This can be done through clicking the buttons on a pointing device, such as a mouse (in the present embodiment), or through keyboard input. In block 71, the subspace is repainted incorporating the decimation or undecimation level. Finally, in block 72, processing control returns to the main event loop.

Figure 12:
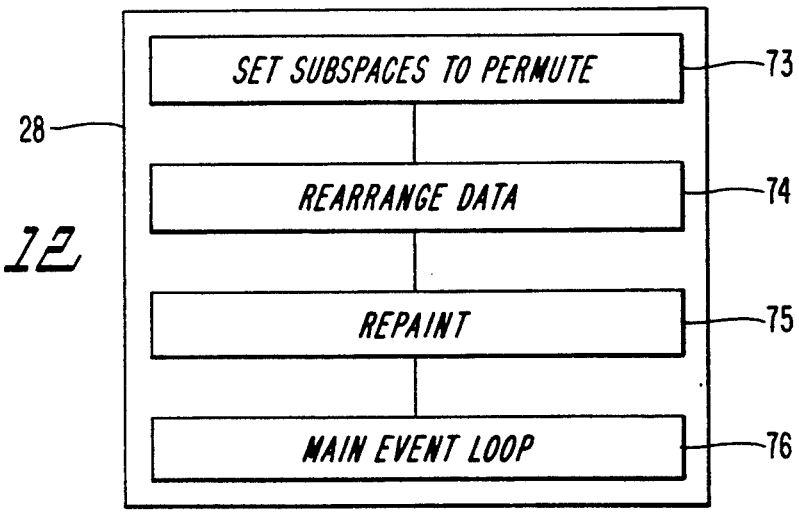
FIG. 12 shows a flow chart of the Permute tool.

FIG. 12 shows a flow chart for the Permute tool. The Permute tool changes the hierarchical assignment of the independent variables. The starting assignment is used as a reference for all future assignments. The functional dependence remains unchanged after using the Permute tool. It is only the order in which the data are plotted which is changed. In short, the Permute tool allows for the exchange of the rankings of the independent variables. This is very useful for determining which ranking gives the most useful or most beneficial visual results.

A related tool is the Array Plot tool 31 of FIG. 4. The Array Plot tool can show all or some combinations of rankings of independent variables in the display space. This allows the user to select which ranking gives the best or desired visual results.

In the present embodiment of the invention, the Permute tool works between pairs of variables. This pairwise exchange has been found to be a very practical way of using the Permute tool, but is not a limitation of the present invention.

In block 73, the subspaces are set to permute. In block 74, the data is rearranged according to the new ranking of the independent variables. In block 75, the displayed space is repainted according to the permutation. Finally, in block 76, processing control returns to the main event loop.

Figure 13:
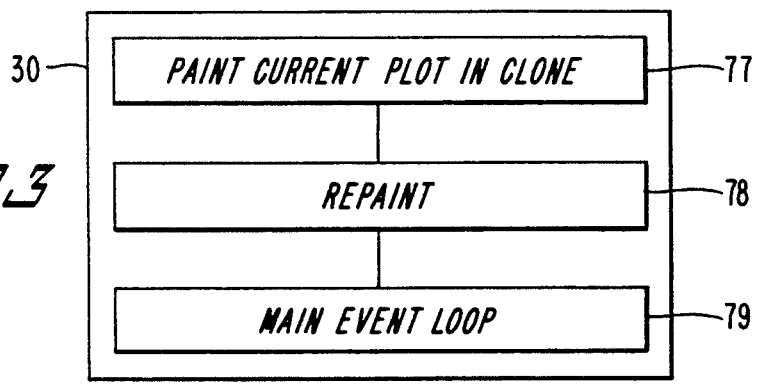
FIG. 13 shows a flow chart of the Cloning tool.

FIG. 13 shows a flow chart for the Cloning tool 30. The Cloning tool simply makes a copy of the currently displayed plot and places it in a window in another part of the screen. This allows the concurrent display of various subspaces. These displayed subspaces can be operated on by various tools to show an overall picture for the user. It can also be used to show different "zooms" at the same time for the user.

In block 77, the current plot is painted into the cloning space. In block 78, the clone spot is repainted onto screen. In block 79, processing control returns to the main event loop.

There are other tools in the program structure of FIG. four 4, such as a Resize Tool 40 and Resize Panel 39. The Resize Tool is used for changing the size of the display space. The Resize Panel is used for changing the size of the display panel which monitors the operation of the display space and the various tools operating on it at any given time.

The Splines tool 29 draws lines between rectangles to be used as a guide for the eye. The Splines that are drawn between rectangles are drawn according to the following criteria:

$$Y = ymin \quad |ymin| >= |ymax|$$

$$Y = ymax \quad |ymin| < |ymax|$$

where ymin and ymax are the minima and maxima of the rectangle through which the spline is drawn. The splines are drawn hierarchically, joining rectangles of the same subspace together.

The nested hierarchical rectangles of the present invention correspond to the behavior of the dependent variable W over independent variable subspaces of various dimensionalities. The following formulas are for the vertical and horizontal locations and extents of these rectangles in world coordinates (not screen coordinates). The corresponding screen coordinates would be measured from the lower left corner of the X window and would, in general, be offset in the scale for each independent variable to reflect the fact that the starting values of each variable may not be zero, and the increment value may vary from one independent variable to the next.

It is useful to denote the independent variables as $X_1$, $X_2 \ldots X_n$ (instead of Xwhite, Xblue, where the colors pertain to the rectangle colors). Here, $X_1$ is the fastest-running variable, $X_2$ is the second fastest-running variable, and so on. Associated with each value of $X_1$ is an independent variable subspace of dimension d=0, i.e., a point. Associated with each value of $X_2$ is an independent variable subspace of dimension d=1, i.e., a line (of points). In general, each value of $X_L$ corresponds to an independent variable subspace of dimension d=L−1, and has a corresponding rectangle (which may be thought of as corresponding to a subspace of dimension L, i.e., L−1 independent variables along the horizontal and one dependent variable, namely w, along the vertical).

Each independent variable $X_L$ takes on values $$X_{L,i} = X_{Ls} + (i-1)\Delta X_L$$

with i=1 to $N_L$

In general, the starting values $X_{Ls}$ may differ, as may the increments $\Delta X_L$ and the total number of values NL. In the formulas given below, we will set $X_{Ls}=0$ and $X_L=1$ which, in fact, corresponds more closely to the actual screen displayed rectangles and is essential in order to obtain correct formulas for the locations and extents of the rectangles.

Formulas

A) The number of Rectangles of Each Type:

the total number of $X_1$ rectangles $$N_{rect1} = \prod_{i=1}^{n} N_i$$

which corresponds to the number of points (d=0) in the independent variable space.

the total number of $X_2$ rectangles $$N_{rect2} = \prod_{i=2}^{n} N_i$$

which corresponds to the number of lines (d=1) along the $X_1$ direction.

the total number of $X_3$ rectangles $$N_{rect3} = \prod_{i=3}^{n} N_i$$

which corresponds to the number of planes (d=2), i.e., ($X_1$, $X_2$) planes.

in general $$N_{rectL} = \prod_{i=L}^{n} N_i$$

and corresponds to the number of subspaces of dimension d=L−1, i.e., ($X_1$, $X_2$ ... $X_{L-1}$) subspaces.

B) The Vertical Extent of the Rectangles

The vertical extent of a rectangle corresponding to a particular value of $X_L$, say, the $i^{th}$ value (hence, corresponding to an independent variable subspace of dimension d=L−1), is given by the difference between the maximum value of the dependent variable in that subspace $W_{L,i,max}$ and the minimum value $W_{l,i,min}$ i.e., $\Delta V_{L,i} = W_{L,i,max} - W_{L,i,min}$

C) Horizontal Extent of the Rectangles

The horizontal extent of a rectangle equals the sum of the corresponding horizontal extents of smaller rectangles within it (which correspond to lower dimensionality)

$$\begin{aligned}\Delta h_{L,i} &= \Delta h_L = N_{L-1} \Delta h_{L-1} = N_{L-1} N_{L-2} \Delta h_{l-2} \\ &= N_{L-1} N_{L-2} \ldots N_1 \Delta h_1 \\ &= \prod_{i=1}^{L-1} N_i \text{ since } \Delta h_1 = 1\end{aligned}$$

It is useful to define $N_O = 1$ and to re-write $\Delta h_L$ as $$\Delta h_L = \prod_{i=0}^{L-1} N_i$$

D) The Vertical Location of the Rectangles

The bottom of the rectangle corresponding to a particular value of $X_L$ is given by $V_{bottom\ L,i} = W_{L,i,min}$ The top of this rectangle is given by $V_{top\ L,i} = W_{L,i,max}$

E) The Horizontal Locations of the Rectangles

The left edge of a rectangle is located at $$H_{L,left} = \sum_{k=L}^{n} (j_k - 1) \prod_{i=0}^{k-1} N_i$$

Here, the set of integers $j_L, j_{L+1} \ldots j_n$ specify which $X_L$ rectangle (i.e., which subspace of dimension d=L−1) one is referring to. Since $\Delta h_{L,left}$ depends on the set $\{j_k\}_{k \geq L}$, one could explicitly write $\Delta h_{L,left}(\{j_k\}_{k \geq L})$.

This expression can be made obvious if one uses the result from C above, namely $$\Delta h_L = \prod_{i=0}^{L-1} N_i \text{ or } \Delta h_k = \prod_{i=0}^{k-1} N_i$$

Hence, $$\begin{aligned}h_{L,left} &= \prod_{k=L}^{n} (j_k - 1) \Delta h_k \\ &= (j_n - 1)\Delta h_n + (j_{n-1} - 1)\Delta h_{n-1} + \ldots + (j_L - 1)\Delta h_L\end{aligned}$$

that is, the sum of moving to the right by ($j_n$−1) largest rectangles of width $\Delta h_n$ plus ($j_{n-1}$−1) next largest etc. plus finally ($j_L$−1) $\Delta h_L$. Again, the set of integers $j_n$, $j_{n-1} \ldots j_L$ specify which $X_L$ rectangle (i.e., which subspace of independent variable dimension d=L−1) one is referring to.

The right side of the rectangle and its center are given by $h_{L,\ right} = h_{L,\ left} + \Delta h_L$ $h_{L,\ right} = h_{L,\ left} + \frac{1}{2}\Delta h_L$

THE EFFECTS OF THE VARIOUS TOOLS

The Zoom In Tools (scaled and unscaled) reduce the dimensionality n.

The Zoom Out Tools (scaled and unscaled) increase the dimensionality n (up to the maximum starting value).

The Animate Tools (scaled and unscaled) increment the value $j_L$.

The General Zoom Tools (scaled and unscaled) reduce $N_L$ with values of $X_L$ remaining contiguous, i.e., $X_L$ constant.

The General Zoom Reset Tool restores $N_L$ to its original value.

The Decimate Tools (scaled and unscaled) reduce $N_L$ with $X_L$ increasing.

The Undecimate Tools (scaled and unscaled) restore $N_L$ to its original value.

The Permute Tool interchanges two variables say $X_i$—$X_j$ hence, in general, affecting $N_i$ and $N_j$ (and in general the pattern of hierarchical rectangles unless $N_i = N_j$, $\{X_i\} = \{X_j\}$ and w has the exact same functional dependence on $X_i$ and $X_j$).

The Resize Tools simply alter the size of the X window or slider widgets (Resize Panel tool).

The Clone Tool simply clones an existing X window.

The Expander Tool is applied about a particular selected point in the multi-dimensional space and displays the variation along the variable ($X_1$) direction, variable ($X_2$) direction, etc. using a homogeneous horizontal increment for each variable rather than a hierarchical increment.

That is, the Expander Tool displays

---

$W(X_1, X_{2 selected}, X_{3 selected} \cdots X_{n selected})$ vs $X_1$
and $W(X_{1 selected}, X_2, X_{3 selected} \cdots X_{n selected})$ vs $X_2$

.
.
.

$W(X_{1 selected}, X_{2 selected}, X_{3 selected}, X_n)$ vs $X_n$
as simple color-coded x,y plots.

---

FIG. 14 shows an example of a computer system 80 on which the present invention can be run. It is comprised of monitor 81, CPU and mass storage device 82, keyboard 83 and mouse 84. Computer system 80 can be in many configurations.

In the present embodiment of the invention, the multi-dimensional graphing in two-dimensional space software was developed and is being run on a Hewlett Packard model 330CH computer, which is described generically as a Motorola 68020 microprocessor, a Motorola 68881 floating point co-processor, a 1280×1024 8-plane graphics card, and 4 megabytes of dynamic RAM. The operating system being used is Hewlett Packard HPUX version 7.0. The program environment is C using the HPUX C-compiler. The graphics environment is the X Windows System TM, as implemented by Hewlett Packard in HPUX 7.0. Those skilled in the art will understand that the present method and system are not limited to this computer system and operating environment. In fact, successful operation of the system has been accomplished on a Sun SPARC station 1 and a Sun 3, both running Sun Operating System; Solbourne computers running Sun Operating System; and 386 machines running Interactive Unix.

A software appendix of the source code implementing the present invention is included.

FIG. 15 shows an irregularly spaced grid and the corresponding plotting of rectangles, respectively.

In irregularly spaced independent variable grid 14A, there is shown multiple data points with spacings $\Delta_1$, $\Delta_2$, $\Delta_3$, $\Delta_4$ along the Y-axis and spacings $\delta_1$, $\delta_2$, $\delta_3$ along the X-axis.

Figure 15A:
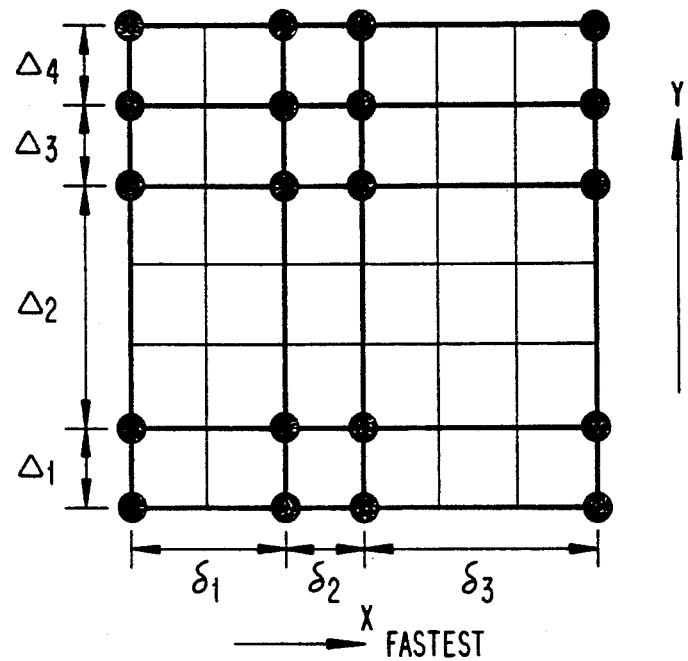
FIGS. 15(a) and 15(b) show additional embodiments of the invention.
Figure 15B:
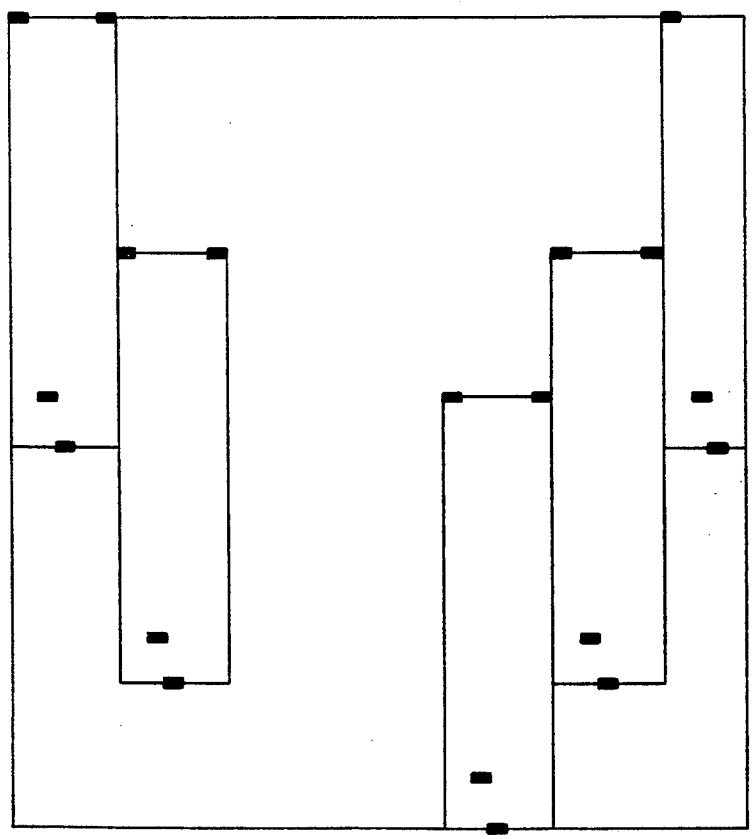

FIG. 15B is one possible rendering involving hierarchical rectangles for the function $W = X^2 + Y^2$. Note that horizontal gaps appear between the rectangles, but that all the rectangles are of the same width.

Even though the $\Delta$ and $\delta$ distances shown in FIG. 15A are integer multiples of $\Delta_i$ and $\delta_i$, it is not a limitation of the system.

Figure 16A:
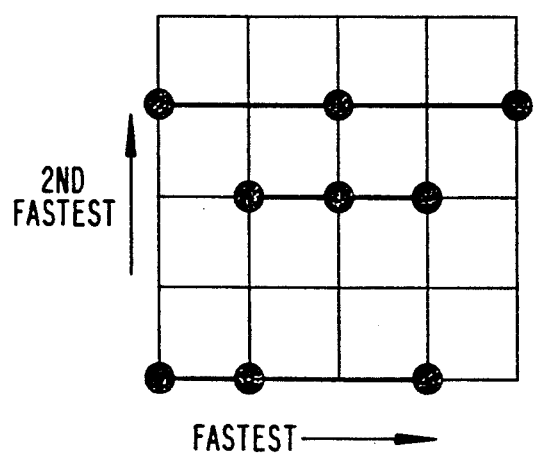
FIGS. 16(a) and 16(b) show additional embodiments of the invention.
Figure 16B:
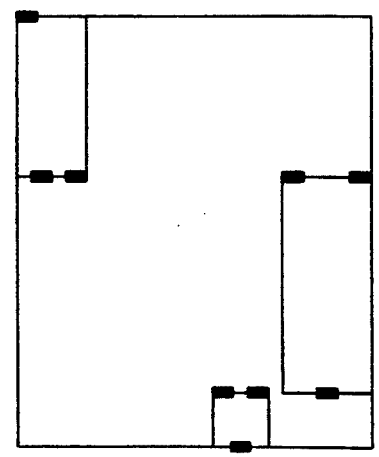

FIGS. 16A and 16B show a case of non-grid sampling of independent variables which are not completely random. A variety of samplings of the independent variable space which are not grid-like, and which are also not perfectly random are possible. Using the data set in FIG. 16A, and applying the function $W = X^2 + Y^2$, the rendering involving hierarchical rectangles in FIG. 16B comes about. Note that the widths of the rectangles vary to reflect the extent of the X-axis variable being sampled.

Figure 17A:
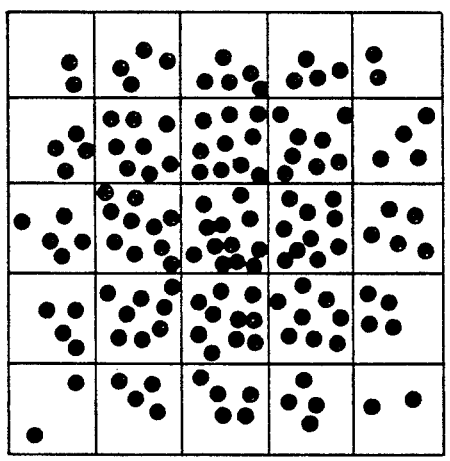
FIGS. 17(a) and 17(b) show additional embodiments of the invention.
Figure 17B:
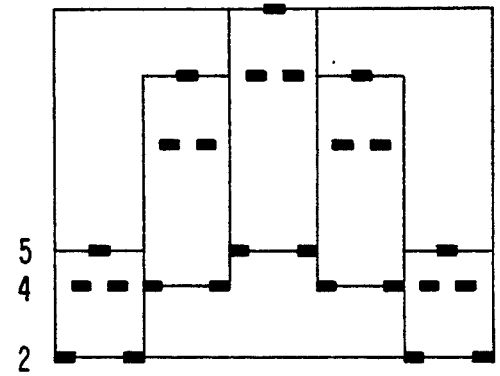

The invention can be extended to the case of randomly sampled independent variables in other ways. First, one could use multi-linear interpolation or more advanced methods to evaluate the dependent variable over a standard grid and then use the invention. Second, one could first treat the "dependent" variable on the exact same footing as the independent variables and perform a multivariate binning. In this case, the number of points in an N+1 dimensional bin (i.e., N original independent variables plus the original dependent variable) would become the new dependent variable and the newly quantized (via the binning process) old dependent variable would be mapped to the hierarchical horizontal axis. This would allow one to look for correlations between the horizontal axis variables. FIGS. 17A and 17B show the simple case of no correlation between the original dependent variable and one independent variable.

Figure 18A:
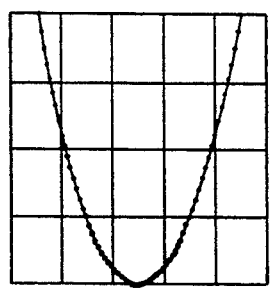
FIGS. 18(a) and 18(b) show additional embodiments of the invention.
Figure 18B:
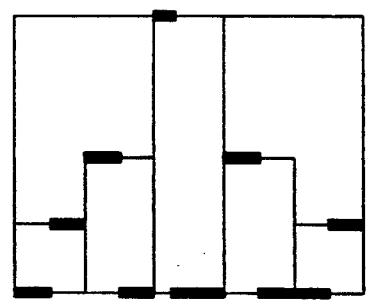

FIGS. 18A and 18B show the simple case $w = x^2$ with no noise and, hence, perfect correlation. The uncorrelated case will show, for example, gaussians of gaussians if the variables are normally distributed. The important point is that the distributions differ from one value of the slower variable to the next only in their amplitude. Note, however, that in the correlated case, the distributions clearly evolve in an orderly fashion not involving a simple amplitude scaling.

Just as one can replace standard 2 dimensional Cartesian x,y plots by the present invention, wherein the dependent variable is plotted along the vertical axis while all independent variables all plotting hierarchically along the horizontal axis, one can replace standard 2d color maps, where the independent variables, say x and y, are plotted along the horizontal and vertical respectively, and color is used to denote the value of the dependent variable, in which both the vertical and horizontal axes are hierarchical. That is, some independent variables are mapped hierarchically to the horizontal axis, and the rest are mapped hierarchically to the vertical axis. In this case, the color of the resulting nested rectangles could be determined by the values of the dependent variable over the corresponding subspace in a variety of ways, such as the maximum within the subspace, the minimum within the subspace, etc., One could also color only those rectangles that have values falling within a specified range of the dependent variable, the remaining rectangles being shown in black.

Figure 19:
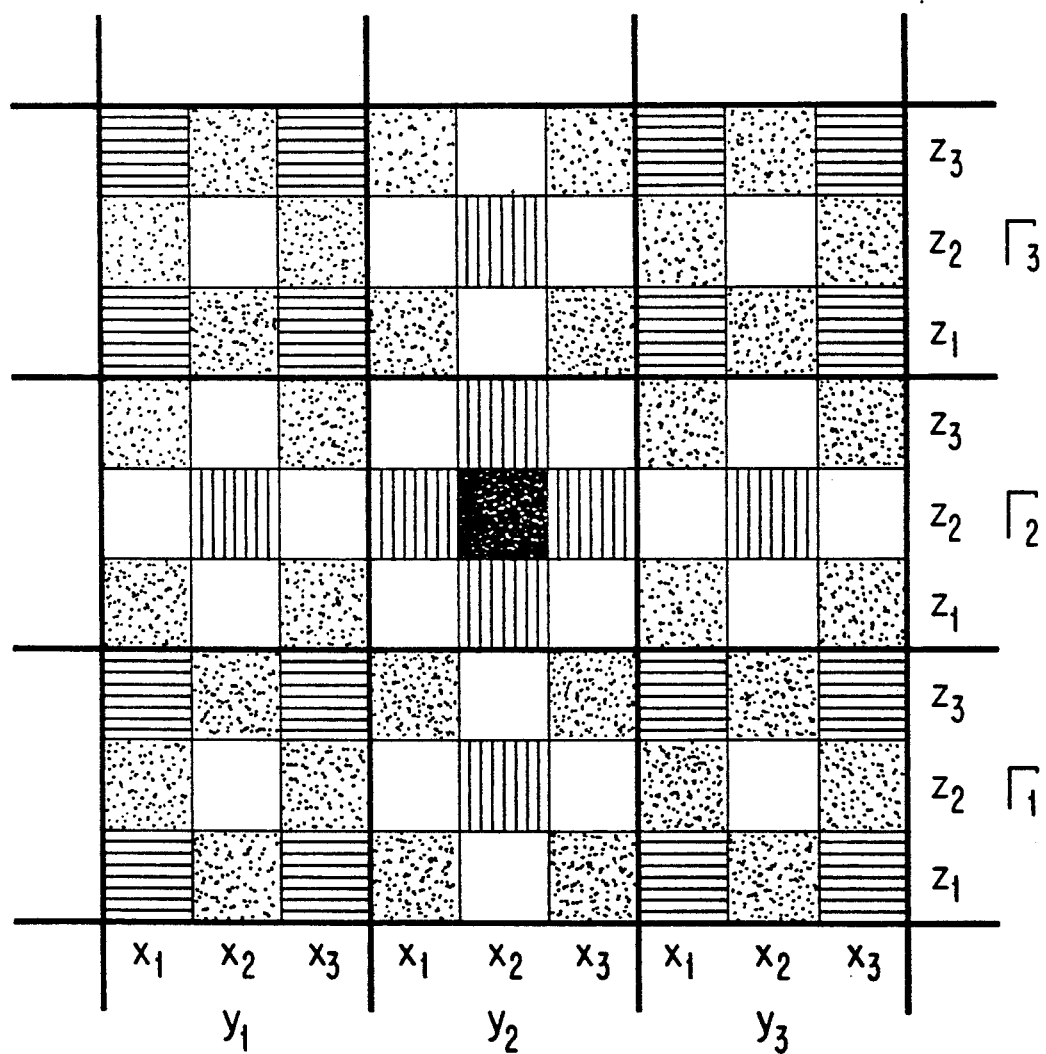
FIG. 19 shows an additional embodiment of the invention.

In FIG. 19, this scheme is shown for the case $w = x_1^2 + y_2^2 + z_3^2 + r_4^2$. Here, w is the dependent variable and $x_1$, $y_2$, $z_3$ and $r_4$ are four independent variables, each of which takes on values of $-1$, 0 and 1. Therefore, the total number of points is $3^4 = 81$. Here, a complete set of tools analogous to those described above could be used for both the independent variables and the dependent variable.

In multi-dimensional graphing in two-dimensional space, it is possible to produce graphs using two or more dependent variables. The prior examples illustrate cases using one dependent variable and multiple independent variables.

In cases where the multiple dependent variables are defined for the same set of independent variables or for some common subset of independent variables, it can be very useful to display all of the dependent variables in the same graph. This allows for visualizing possible correlations which may be occurring between the dependent variables for certain combinations of the independent variables.

One way of accomplishing this is to establish one or more new independent variables which are associated with the set of dependent variables. The new independent variables which refer to dependent variables are called dependent variable selection, or DVS variables. For example, in plotting R-dependent variables, each of which is a scalar, a DVS variable would be established having values 1, 2, 3, ... R. The collection of R dependent variables in this example can be thought of as a vector, or a singly subscripted array (i.e., $A_i$ with $i=1$ to R).

This singly subscripted array may not correspond physically to a vector. In some cases, it could refer to a collection of variables, such as specific heat, lattice constant, magnetic susceptibility, and thermal conductivity. This collection would not normally be thought of as components of a vector, but could very well be part of a materials properties database. It must be repeated that the applicability of the present invention is not limited to mathematical formulas, but rather to all functions. As functions are defined as a locus of points, many forms of data are applicable for graphing with the present invention. This includes database information, statistical information, matrix information, and mathematical formulas. Another example of dependent variables could be the x, y, and z components of a vector representing an electric field.

Whether it is a simple database component or a component of a mathematical formula, the use of new independent variables representing the DVS allows for multiple dependent variable representation. In the case of a materials property database, a new independent DVS variable could be established having a value of 1 representing specific heat; a value of 2 representing the lattice constant; a value of 3 representing magnetic susceptibility; and a value of 4 representing thermal conductivity. In the case of the electric field vector, a value of 1 could represent the x component of the vector; the value 2 could represent the y component; and the value 3 could represent the z components of the vector.

It is also possible to portray the multiple dependent variables as doubly subscripted arrays of the form $A_{ij}$. In this example, two DVS variables are created, with one covering the range of integers i ($i=1$ to $R_i$) and the other covering the range of integers j ($j=1$ to $R_j$). For this doubly subscripted array example, the number of scalar dependent variables is $R_i * R_j$, as long as there are no missing values.

The collection of values for $A_{ij}$ might actually correspond to a property which is usually regarded as a tensor or a matrix.

The collection of data values may also be organized into $R_i$ categories, with each category having one or more properties (dependent variables) within it. In this case, the first dependent variable (the i in $A_{ij}$) could be thermodynamic properties. The second dependent variable (the j in $A_{ij}$) could represent several different properties within this variable. This organization structure would be repeated for the other first dependent variables. In all cases, the multi-dimensional graphing in two-dimensional space allows for database visualization and the use of the tools that have been previously described.

Further examples could involve multiple dependent variables that involve arrays with three or four or more subscripts by introducing three or four or more DVS variables to represent them. In each case, the DVS variables are treated in the same manner as all other independent variables. Further, the DVS variables will also function with non-regular grid values (grid spacing) as described with reference to FIGS. 15-18.

Shown in FIGS. 20A, 20B, 20C, and 21-23 are examples where one DVS independent variable has been added for the case of three dependent variables.

Figure 20A:
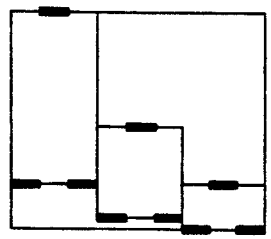
FIGS. 20(a), 20(b), and 20(c) show illustrations of example applications of he present invention.

FIGS. 20A, 20B, 20C, and 21-23 illustrate examples of the present invention, where one DVS independent variable has been added corresponding to three dependent variables. In FIG. 20A, there is shown a multi-dimensional graph in two-dimensional space for a dependent variable A versus two independent variables, t and h. Here, t is represented as the fastest-running variable and h as the slowest-running variable. Each independent variable in FIG. 20A has three associated values.

Figure 20B:
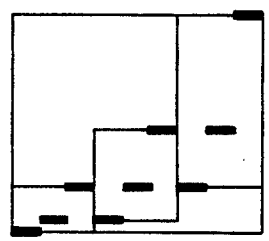

FIG. 20B is a graph for a second dependent variable B. The values of B can be normalized so that the numerical value of the maximum value of B ($B_{max}$) is identical to the maximum value of A ($A_{max}$) of FIG. 20A. In general, the values of the independent variables of A and B can be different. The two independent variables in FIG. 20B are identical to those in FIG. 20A, with t being the fastest-running variable and h being the slowest-running variable.

Figure 20C:
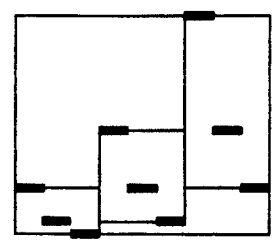

FIG. 20C is a graph for a third dependent variable C. Again, the values of C have been normalized so that $C_{max} = A_{max}$. The two independent variable t and h are identical to those in FIGS. 20A and 20B, with t as the fastest-running variable and h as the slowest-running variable.

If the dependent variables A, B and C have the same unit or dimension, as in the case of the three components of a vector, it might not be desirable to normalize them so that $A_{max} = B_{max} = C_{max}$. This is obviously dependent upon the application for which the present invention is being applied.

Figure 21:
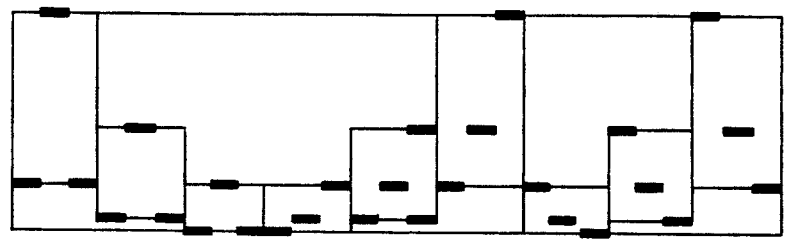
FIG. 21 shows an illustration of example applications of the present invention.

FIG. 21 is a graph of the results after defining a new DVS-type independent variable. In FIGS. 20A, 20B, and 20C, the DVS independent variable is the slowest-running variable, t is the fastest-running variable, and h is the second fastest-running variable.

Figure 22:
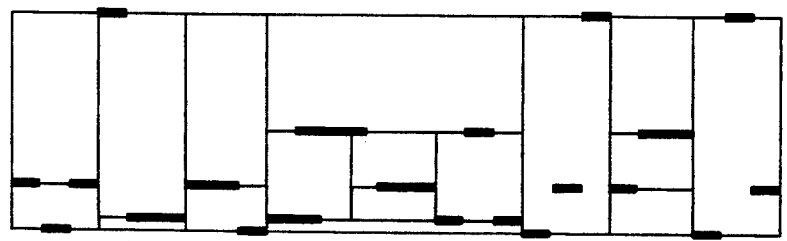
FIG. 22 shows an illustration of example applications of the present invention.

FIG. 22 is a graph of the same information as in FIG. 21, except that the DVS independent variable is displayed as the fastest-running variable, while t is the second fastest-running variable, and h is the slowest-running variable.

Figure 23:
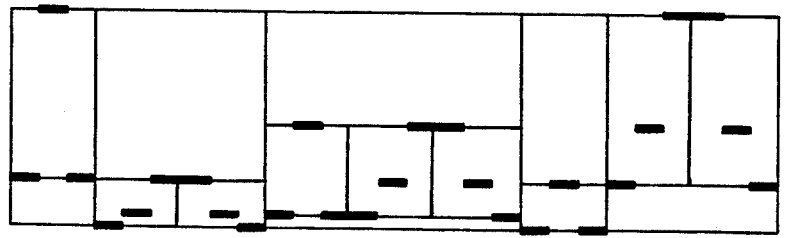
FIG. 23 shows an illustration of an example application of the present invention.

FIG. 23 is a graph of the same information as in FIGS. 21 and 22, except that t is now the fastest-running variable, the DVS independent variable is the second fastest-running variable, and h is the slowest-running variable.

Figure 24:
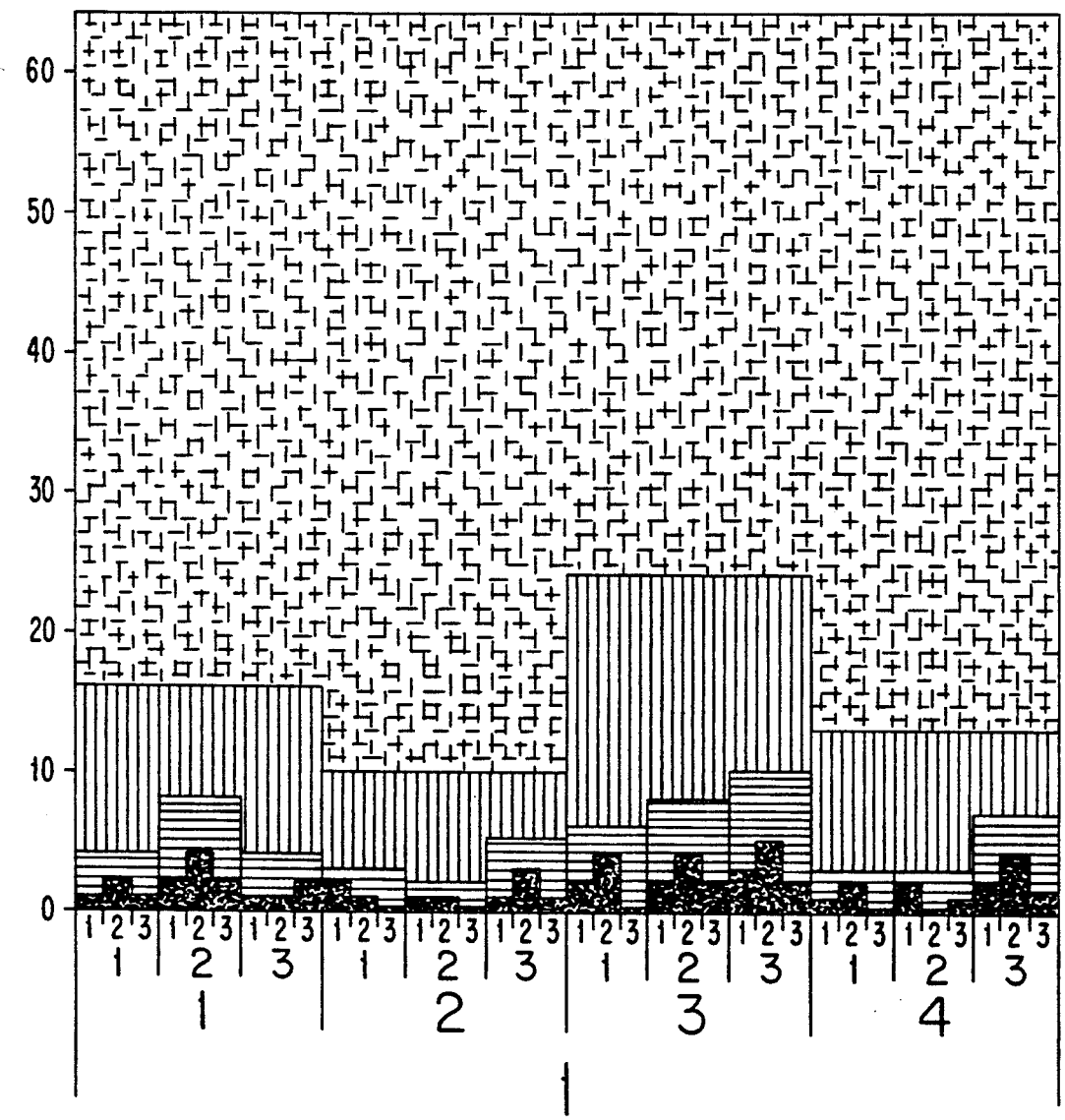
FIG. 24 shows an illustration of an example application of the present invention.

FIG. 24 is a multi-dimensional graph in two-dimensional space, wherein the rectangles have a width corresponding to the independent variable value. The vertical or height of the rectangles from zero on the y-axis is determined by summing the heights or vertical distances of the preceding slowest-running variable (the largest rectangle contained within the rectangle of interest). This provides a different visualization of the function being graphed than the manner of graphing where the rectangle's vertical boundaries were based on the minimum and maximum values of the preceding rectangles (largest rectangles contained within the rectangle of interest).

The rectangles are colored, as in the other cases. An additional feature allows the user to select which rectangle is to be drawn first, and, therefore, could possibly be masked or partially masked by later drawn rectangles. The user also may select the order in which the remaining rectangles are drawn. When the graphing of the rectangles is complete, the user can choose to redraw any particular rectangles to account for masking.

To illustrate drawing the rectangles, consider a rectangle corresponding to an independent variable subspace of dimension r. The non-zero vertical end (other vertical extreme) of this rectangle, $V_r$, is given by the equation $$V_r = \sum_{i=1}^{n_{r-1}} V_{r-1,i}$$

where $V_{r-1,i}$ is the non-zero vertical extreme of the $i^{th}$ rectangle corresponding to a subspace of dimension $r-1$ and $n_{r-1}$ is the total number of rectangles corresponding to a subspace of dimension $r-1$.

The graph shown in FIG. 24 shows a multi-dimensional graph in two-dimensional space with rectangles based on the sum of the next largest rectangles contained within. For the simple three independent variable case of FIG. 24, black is the fastest variable, blue is the next-fastest and red is the slowest-running variable. The black and blue variables have three values, while the red variable has four values. In this case, the dependent variable is positive definite (i.e., either positive or zero).

Figure 25:
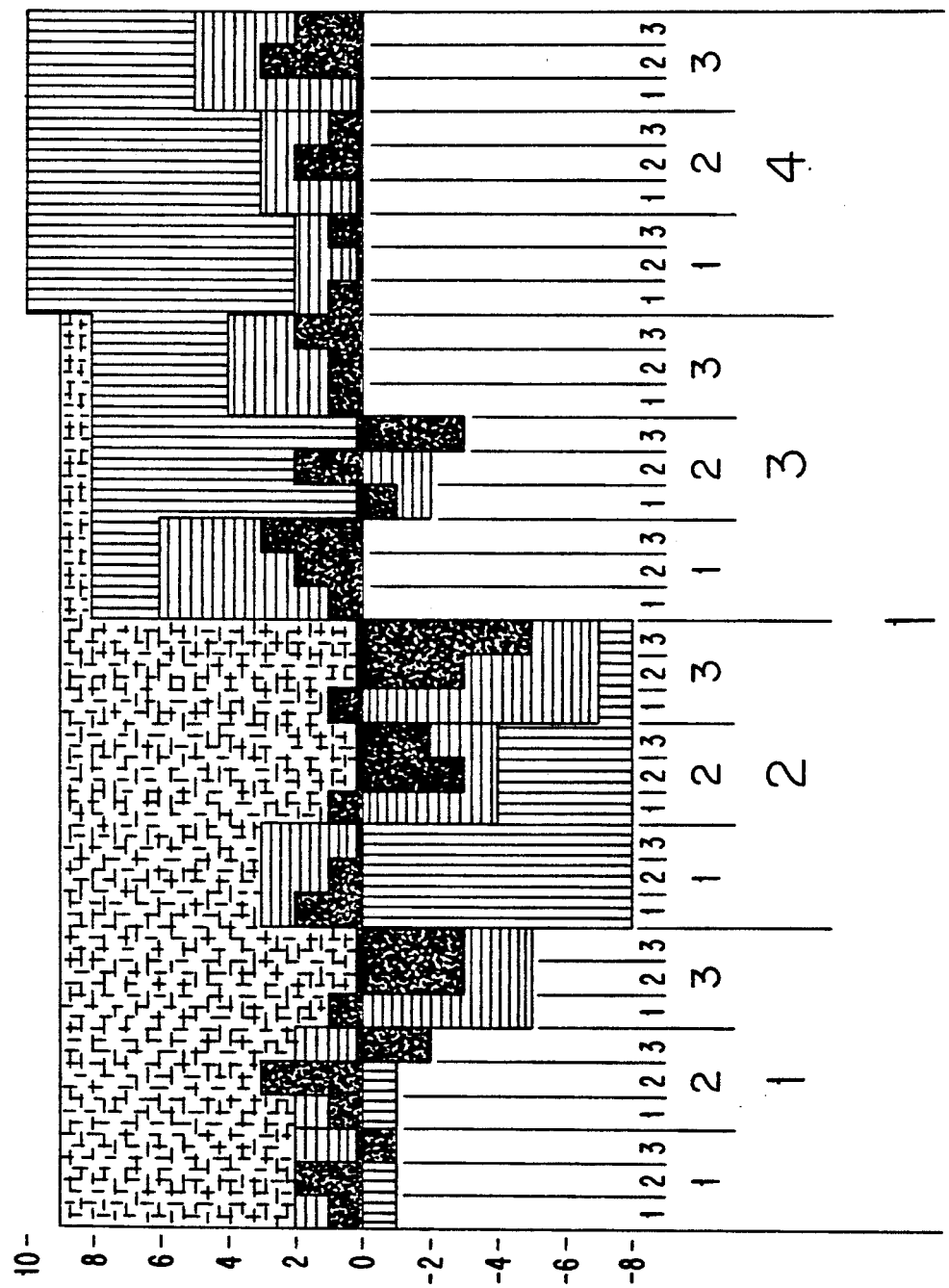
FIG. 25 shows an illustration of an example application of the present invention.

FIG. 25 shows another graph where the height of the rectangles are determined by summing the values of the next-largest rectangle contained within the rectangle of interest. The graphing of rectangles using minimum and maximum as for graphs prior to FIG. 23 can be expressed recursively as:

$V_{rlower}$=minimum of all $V_{r-1}$ within the r subspace rectangle width of interest;
and
$V_{rupper}$=maximum of all $V_{r-1}$ within the r subspace rectangle width of interest;
and
$V_{olower} = V_{olower} = W$ the value of the dependent variable at the point of interest.

Similarly, the graphing of rectangles using the summation of the next-largest rectangles contained within the rectangle of interest can be expressed recursively as:

$$V_{rzero} = 0;$$
and $$V_{r(other\ vertical\ extreme)} = \sum_{i=1}^{n_{r-1}} V_{r-1,i(other\ vertical\ extreme)};$$

and
$$V_{ozero} = 0;$$
and $V_{o(other\ vertical\ extreme)} = W$ the value of the dependent variable at the point of interest.

A simple variation on this scheme would be to use the average, i.e., $$V_{r(other\ vertical\ extreme)} = 1/n_{r-1} * \sum_{i=1}^{n_{r-1}} V_{r-1,i(other\ vertical\ extreme)}$$

In FIG. 25, the black rectangles are the fastest-running variable, the blue rectangles are the next fastest, the red rectangles are the next-fastest, and the yellow rectangle is the slowest-running variable. Different from the other figures, it can be seen that certain rectangles contain slower-running variables having a vertical dimension which exceeds the vertical dimension of the slower-running variable. These rectangles exceed the slower-running variable in both the positive and negative directions, as shown at $red_1$, $blue_2$, $black_2$ and $red_3$, $blue_2$, $black_3$, respectively. With the use of negative values, it is possible for a nested rectangle to exceed the sum of the nested rectangles, as a negative value takes away from the summed value. In this particular graph, the summed values are not summed absolute values.

In FIG. 25, the base of each rectangle is always at zero, and the other vertical extremity is based upon the sum of the next slowest-running variable contained within.

Figure 26:
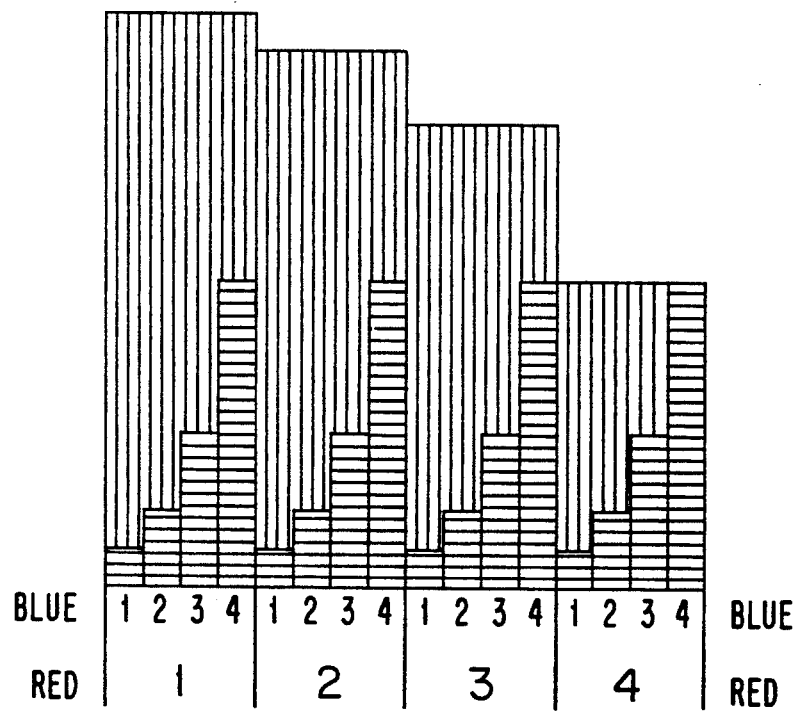
FIG. 26 shows an illustration of an example application of the present invention.
Figure 15A:
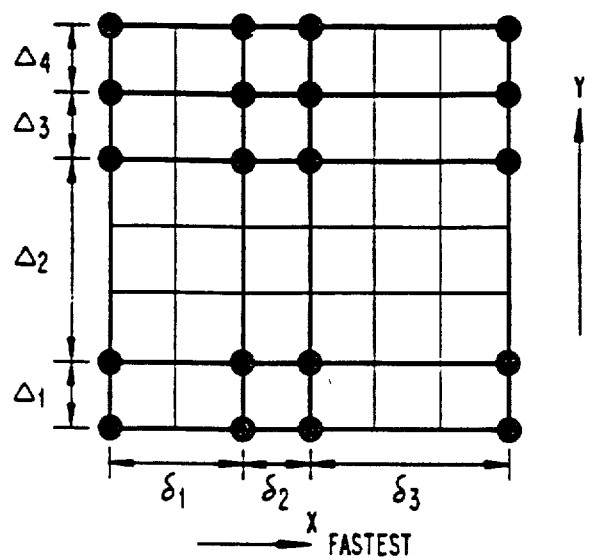
Figure 15B:
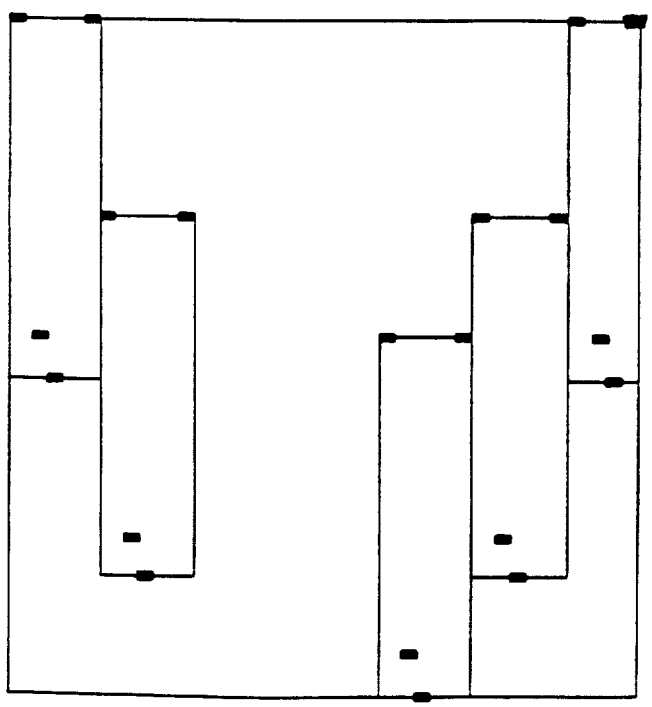

There is shown in FIG. 26 a graph for a case where the vertical extreme (the other end of the rectangle away from the zero base) is a new function of the vertical extremes of rectangles corresponding to $r-1$ dimensional subspaces within the r-dimensional subspace.

It can be seen that one vertical extreme is set to zero, while the other vertical extreme is obtained by summing the non-zero vertical coordinates of a subset of the nested rectangles according to the following formula:

$$V_{red(other\ vertical\ extreme)} = \sum_{i=red_{variable\ value}}^{4} V_{blue(other\ vertical\ extreme)}.$$

It is possible to let the functions depend on which subspace of dimensions r one is considering. In this case, the functions could depend on the values of slower-running variables. In general, both vertical extremes of a given rectangle could depend on any function of the vertical extremes of smaller rectangles and/or the values of all slower- and faster-running independent variables.

Those skilled in the art will immediately recognize the utility of the present invention in the areas of graphing and data/function analysis.

It will be apparent to those skilled in the art that various modifications can be made to the system and method for graphing multi-dimensional data sets and functions of the present invention without departing from the scope or spirit of the invention, and it is intended that the present invention cover modifications and variations of the system and method for graphing multi-dimensional data sets and functions provided they come within the scope of the appended claims and their equivalents.

It is claimed:

1. A method using a system including a computer with a display for displaying a function in two dimensions, said display defined by an X-axis and a Y-axis wherein said function is comprised of a plurality of independent variables and at least one dependent variable, each independent variable having associated values, the method comprising the steps of:
  a. defining a new independent variable for said dependent variables, said new independent variables having associated values, each of said values representing one dependent variable;
  b. reading the values associated with all of the independent variables;
  c. selecting which independent variable is a fastest-running independent variable, and ranking the selected independent variable as the fastest-running independent variable;
  d. selecting which independent variable is a next fastest-running independent variable, and ranking the selected independent variable as the next faster-running independent variable;
  e. repeating step (d) until all independent variables are ranked, with a last ranked independent variable being a slowest-running independent variable;
  f. determining a result for each value of a new independent variable and for all combinations of the values of all independent variables other than the new independent variables;
  g. plotting the results determined in step (f) along the Y-axis, with the corresponding values associated with all independent variables along the X-axis in a hierarchical manner, said plotting comprising the steps of:
    (1) sequentially displaying the result corresponding to the values associated with the fastest-running independent variable for a first value of the next faster-running independent variable and a first value of each of the remaining independent variables;
    (2) sequentially displaying the result corresponding to the values associated with the fastest-running independent variable for a second value for the next fastest-running independent variable and a first value for each of the remaining independent variables;
    (3) repeating steps (g)(2) for each remaining value of the next fastest-running independent variable;
    (4) repeating steps (g)(1)–(g)(3) for each value of any remaining independent variable until completed for a last value of the slowest-running independent variable;
  h. displaying a group of rectangles, each rectangle having a first vertical extreme and a second vertical extreme, said rectangles horizontally enclosing the plotted results associated with an independent variable, said group of rectangles containing a nesting of rectangles of faster-running independent variables horizontally within the rectangles of slower-running independent variables according to the hierarchical manner in which the results associated with the independent variables are plotted; and
  i. repeating steps (f) and (g) for each remaining new independent variable.

2. The method of claim 1 wherein said group of rectangles displayed in step (h) are comprised of different colored rectangles.

3. The method of claim 2 wherein each color represents a different independent variable.

4. The method of claim 1 wherein said first vertical extreme of each rectangle is on the Y-axis line and the second vertical extreme of the rectangle representing the fastest-running variable is at the point corresponding to the value of each particular fastest-running variable.

5. The method of claim 4 wherein the second vertical extreme of each rectangle is equal to the sum of the second vertical extremes of the rectangles associated with the next fastest-running variable.

6. The method of claim 5 wherein the values of the dependent variables are both positive and negative.

7. The method of claim 1 comprising the further step of selecting which of the rectangles displayed in step (h) is to be displayed first.

8. The method of claim 7 comprising the further step of selecting the order in which the remaining rectangles are displayed.

9. The method of claim 1 wherein the second vertical extreme of each rectangle is determined by a predetermined function.

10. The method of claim 9 wherein the predetermined function defines a subset of the nested rectangles.

11. The method of claim 10 wherein the nested rectangles correspond to the next fastest-running variable.

12. The method of claim 1, wherein more than one new independent variable is defined in step (a), each of said more than one new independent variables corresponding to a set of dependent variables, and each new independent variable having associated new values relating to a property of said corresponding dependent variable.

13. A system using a computer for displaying a function in two dimensions on a display, said display defined by an X-axis and a Y-axis, wherein said function is comprised of a plurality of independent variables and at least one dependent variable, each independent variable having associated values, the system comprising:
  a. defining means for defining a new independent variable for said dependent variables, said new independent variables having associated values, each of said values representing one dependent variable;
  b. reading means for reading the values associated with all of the independent variables;
  c. first selecting means for selecting which independent variable is a fastest-running independent variable and ranking the selected independent variable as the fastest-running independent variable;
  d. second selecting means for selecting which independent variable is a next fastest-running independent variable and ranking the selected independent variable as the next faster-running independent variable;
  e. ranking means for repeating said selection of the next fastest-running independent variable until all independent variables are ranked with a last ranked independent variable being a slowest-running independent variable;
  f. determining means for determining a result for each value of a new independent variable and for all combinations of the values of all remaining independent variables other than the new independent variable;
  g. plotting means for plotting said results along the Y-axis with the corresponding values associated with the independent variables along the X-axis in a hierarchical manner, said plotting means comprising:
    (1) first sequentially displaying means for sequentially displaying the result corresponding to the values associated with the fastest-running independent variable for a first value of the next fastest-running independent variable and a first value of each of the remaining independent variables;

(2) second sequentially displaying means for sequentially displaying the result corresponding to the values associated with the fastest-running independent variable for a second value of the next fastest-running independent variable and a first value for each of the remaining independent variables;

(3) first repeating means for repeating the sequential display by the second sequentially displaying means for each remaining value of the next fastest-running independent variable;

(4) second repeating means for repeating the sequential display by the first sequentially displaying means, by the second sequentially displaying means, and by the first repeating means for each value of any remaining independent variable until completed for a last value of the slowest-running independent variable;

h. group means for displaying a group of rectangles, each rectangle having a first vertical extreme and a second vertical extreme, said rectangles horizontally enclosing the plotted results associated with an independent variable, said group of rectangles containing a nesting of rectangles of faster-running independent variables within the rectangles of slower-running independent variables according to the hierarchical manner in which the results associated with the independent variables are plotted; and i. looping means for repeating the determining of the results by said determining means, and for repeating the plotting of the results by said plotting means for each remaining new independent variable.

14. The method of claim 1 further comprising, after step (h), the step of:

(h2) graphically connecting the plotted result of each fastest running variable nested within a rectangle of the next fastest running variable.

15. The method of claim 14 further comprising, after step (h2), the step of:

(h3) graphically connecting the plotted result of a fastest running variable located within a rectangle of the next fastest running variable with the plotted result of a fastest running variable located within all other rectangles of the next fastest running variable.

16. The method of claim 1 further comprising, after step (h), the step of:

(h2) graphically connecting the plotted result of a fastest running variable located within a rectangle associated with a particular independent variable with a corresponding plotted result of a fastest running variable located within all other rectangles associated with the same independent variable.

17. The method of claim 16 further comprising, after step (h2), the step of repeating step (h2) for all independent variables.

18. The method of claim 14 wherein step (h2) further includes graphically connecting the plotted results using a line.

19. The method of claim 14 wherein step (h2) further includes graphically connecting the plotted results using a curve.

20. The method of claim 1 wherein step (h) further includes displaying the rectangles with each rectangle having a height equal to the difference between a maximum and minimum value of the independent variable associated with the rectangle.

21. The method of claim 1 wherein step (h) further includes graphically connecting the rectangles associated with a given independent variable.

22. The method of claim 21 wherein step (h) further includes graphically connecting the rectangles at a corresponding point in each rectangle.

23. The method of claim 22 wherein the corresponding point is a top center point of each rectangle.

24. The method of claim 1 wherein the values read in step (b) comprise a grid.

25. The method of claim 24 wherein step (b) further includes the steps of:

b1. reading a first value;

b2. reading a last value;

b3. reading an incremental value; and b4. generating the grid using the incremental value to generate values between the first value and the last value to form the grid.

26. The method of claim 1 wherein step (g) further includes, after step (g)(4), the step of:

(5) displaying the results of steps (g)(1) to (g)(4) together.

27. A method using a system including a computer with a display for displaying a function of at least one independent variable and at least one dependent variable, the method comprising the steps of:

a. defining a new independent variable for said dependent variables, said new independent variables having associated values;

b. reading the values;

c. selecting which independent variable is a fastest-running independent variable, and ranking the selected independent variable as the fastest-running independent variable;

d. selecting which independent variable is a next fastest-running independent variable, and ranking the selected independent variable as the next fastest-running independent variable;

e. repeating step (d) until al independent variables are ranked;

f. determining a result for each value of a new independent variable and for all combinations of the values of all independent variables;

g. plotting the results determined in step (f), said plotting comprising the steps of:

(1) sequentially displaying the result corresponding to the values associated with the fastest-running independent variable for a first value of the next fastest-running independent variable and a first value of each of the remaining independent variables;

(2) sequentially displaying the result corresponding to the values associated with the fastest-running independent variable for a second value of the next fastest-running independent variable and a first value for each of the remaining independent variables;

(3) repeating steps (g)(2) for each remaining value of the next fastest-running independent variable;

(4) repeating steps (g)(1)–(g)(3) for each value of any remaining independent variable;

h. displaying a group of rectangles, said group of rectangles containing a nesting of rectangles of faster-running independent variables within the rectangles of slower-running independent variables; and i. repeating steps (f) and (g) for each remaining new independent variable.

28. A system using a computer for displaying a function of at least one independent variable and at least one dependent variable, the system comprising:

a. defining means for defining a new independent variable for said dependent variables, said new independent variables having associated values;

b. reading means for reading the values;

c. first selecting means for selecting which independent variable is a fastest-running independent variable and ranking the selected independent variable as the fastest-running independent variable;

d. second selecting means for selecting which independent variable is a next fastest-running independent variable and ranking the selected independent variable as the next fastest-running independent variable;

e. ranking means for repeating said selection of the next fastest-running independent variable until all independent variables are ranked;

f. determining means for determining a result for each value of a new independent variable and for all combinations of the values of all remaining independent variables;

g. plotting means for plotting said results, said plotting means comprising:

(1) first sequentially displaying means for sequentially displaying the result corresponding to the values associated with the fastest-running independent variable for a first value of the next fastest-running independent variable and a first value of each of the remaining independent variables;

(2) second sequentially displaying means for sequentially displaying the result corresponding to the values associated with the fastest-running independent variable for a second value of the next fastest-running independent variable and a first value for each of the remaining independent variables;

(3) first repeating means for repeating the sequential display by the second sequentially displaying means for each remaining value of the next fastest-running independent variable;

(4) second repeating means for repeating the sequential display by the first sequentially displaying means, by the second sequentially displaying means, and by the first repeating means for each value of any remaining independent variable until completed for a last value of the slowest-running independent variable;

h. group means for displaying a group of rectangles, said group of rectangles containing a nesting of rectangles of faster-running independent variables within the rectangles of slower-running independent variables; and i. looping means for repeating the determining of the results by said determining means, and for repeating the plotting of the results by said plotting means for each remaining new independent variable.

* * * * *

UNITED STATES PATENT AND TRADEMARK OFFICE
CERTIFICATE OF CORRECTION

PATENT NO. : 5,228,119

DATED : July 13, 1993

INVENTOR(S) : Ted W. Mihalisin, John Timlin, Edward T. Gawlinski and John W. Schwegler It is certified that error appears in the above-identified patent and that said Letters Patent is hereby corrected as shown below:

On drawings Figures:

Sheet 11 of 17, FIG. 15B: add a point on the upper-right-hand corner as shown on the attached drawing:

Column 1, line 19: change "Y" to --X-- and change "X" to --Y--.

Column 5, line 10: delete "ext" and add --next--.

Column 5, line 23: delete "not" and add --no--.

Column 5, lines 42-43: delete "FIGS. 3A, 3B and 3C. FIGS. 3A, 3B, and 3C are" and add --FIGS. 3A and 3B. FIG. 3A is a--.

Column 6, line 48: insert --(-- immediately before "subroutine calls)".

UNITED STATES PATENT AND TRADEMARK OFFICE
CERTIFICATE OF CORRECTION

PATENT NO. : 5,228,119

DATED : July 13, 1993

INVENTOR(S) : Ted W. Mihalisin, John Timlin, Edward T. Gawlinski and John W. Schwegler It is certified that error appears in the above-indentified patent and that said Letters Patent is hereby corrected as shown below:

Column 12, line 49, change subscript "right" to --center--

Signed and Sealed this

Twelfth Day of April, 1994

Attest:

BRUCE LEHMAN

Attesting Officer

Commissioner of Patents and Trademarks